United States Patent
Tabuki

(10) Patent No.: US 8,049,916 B2
(45) Date of Patent: Nov. 1, 2011

(54) IMAGE PROCESSING APPARATUS AND METHOD HAVING COPY-FORGERY-INHIBIT FUNCTIONALITY

(75) Inventor: Masumi Tabuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 490 days.

(21) Appl. No.: 12/164,687

(22) Filed: Jun. 30, 2008

(65) Prior Publication Data

US 2009/0009801 A1 Jan. 8, 2009

(30) Foreign Application Priority Data

Jul. 2, 2007 (JP) ................. 2007-174578

(51) Int. Cl.
*G06F 3/12* (2006.01)
*H04N 1/40* (2006.01)
(52) U.S. Cl. ...................... 358/1.15; 358/3.28
(58) Field of Classification Search .......... None
See application file for complete search history.

(56) References Cited

U.S. PATENT DOCUMENTS

| 5,788,285 | A | * | 8/1998 | Wicker | 283/93 |
| 6,574,350 | B1 | * | 6/2003 | Rhoads et al. | 382/100 |
| 7,149,451 | B2 | * | 12/2006 | Uchida et al. | 399/81 |
| 2006/0028689 | A1 | * | 2/2006 | Perry et al. | 358/3.28 |
| 2007/0147929 | A1 | * | 6/2007 | Ishimoto et al. | 400/62 |

FOREIGN PATENT DOCUMENTS

JP 11-146119 A 5/1999

* cited by examiner

*Primary Examiner* — Twyler L. Haskins
*Assistant Examiner* — Christopher D Wait
(74) *Attorney, Agent, or Firm* — Cowan, Liebowitz & Latman, P.C.

(57) ABSTRACT

When a process which does not carry out printing of image data by a print function is designated, based on the setting for the process, a determination is made as to whether a print function restriction setting is to be applied or not. As a result of the determination, when it is determined that the print function restriction setting is to be applied, a predetermined image is merged with the image data.

4 Claims, 25 Drawing Sheets

| USER BOX | | | | |
|---|---|---|---|---|
| BOX NUMBER | NAME | PERCENT USED | | REMOVABLE MEDIUM ▶ |
| 🖃 00 | | 7% | ▲ | SYSTEM BOX ▶ |
| 🖃 01 | | 2% | 1/12 | |
| 🖃 02 | | 0% | ▼ | FAX BOX ▶ |
| 🖃 03 | | 0% | | |
| 🖃 04 | | 0% | | REMAINING MEMORY |
| 🖃 05 | | 0% | | 75% |
| 🖃 06 | | 0% | | |

[ CANCEL ]    [ EXECUTE ]

[ SYSTEM STATUS / SUSPEND ]

START
↓
SCAN SETTING — S601
↓
BOX DESIGNATION — S602
↓
SCAN — S603
↓
STORE SCANNED IMAGE — S604
↓
END

FIG. 20

| USER MODE (PRINT FUNCTION RESTRICTION SETTING : EXCEPTION SETTING) |
|---|

- COPY-FORGERY-INHIBITED PATTERN PRINT: ON (2001) ☑ EXCEPTION APPLICABLE — OFF
- PAGE PRINT: ON ☐ EXCEPTION APPLICABLE — OFF
- DATE PRINT: ON ☐ EXCEPTION APPLICABLE — OFF
- STAMP PRINTING: ON ☐ EXCEPTION APPLICABLE — OFF

[CANCEL] [EXECUTE] (2002)

SYSTEM STATUS / SUSPEND

FIG. 21

USER MODE (PRINT FUNCTION RESTRICTION SETTING)

| ADDRESS | ADDRESS DETAIL | PROTOCOL |
|---|---|---|
| PERSON A | A.iFax@a.co.jp | I-Fax |
| PERSON B | 03-XXXX-XXXX | G3-Fax |
| PERSON C | C.email@c.co.jp | E-mail |

1 / 1

[CANCEL] [EXECUTE]

SYSTEM STATUS / SUSPEND

FIG. 23
(a) DOCUMENT IMAGE 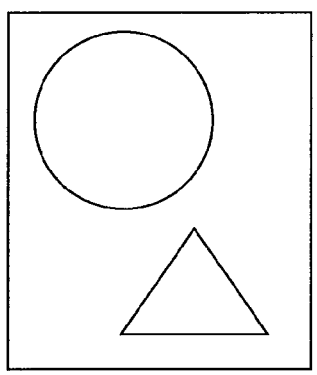 (b) BACKGROUND IMAGE 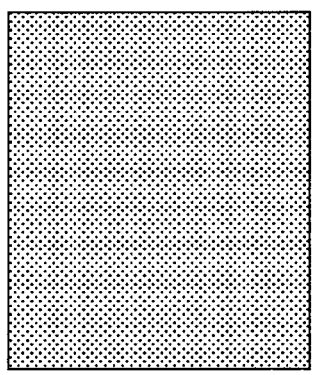 (c) LATENT IMAGE
X
(d) MERGED IMAGE

FIG. 27

| BOX NUMBER | NAME | PERCENT USED |
|---|---|---|
| 00 | | 7% |
| 01 | | 2% |
| 02 | | 0% |
| 03 | | 0% |
| 04 | | 0% |
| 05 | | 0% |
| 06 | | 0% |

USER BOX (TRANSFER / COPY ORIGIN SELECTION)

1 / 12

REMOVABLE MEDIA ▶
SYSTEM BOX ▶
FAX BOX ▶
REMAINING MEMORY 75%

CANCEL

EXECUTE

SYSTEM STATUS / SUSPEND

FIG. 28

USER BOX (TRANSFER / COPY ORIGIN SELECTION) / 00

| | TYPE | DOCUMENT NAME | PAPER SIZE | PAGES NUMBER | DATE |
|---|---|---|---|---|---|
| ☑ | WITH JOB | DOCUMENT 1 | A4 | 5 | 12 / 1 |
| ☐ | IMAGE | DOCUMENT 2 | A3 | 2 | 12 / 10 |
| ☐ | WITH JOB | DOCUMENT 3 | A4 | 12 | 12 / 3 |
| ☐ | | | | | |
| ☐ | | | | | |
| ☐ | | | | | |

1 / 1

SELECT / CANCEL

CANCEL            2802    OK

SYSTEM STATUS / SUSPEND 2801
2802

FIG. 29

USER MODE (SYSTEM MANAGEMENT SETTING)

PRINT FUNCTION RESTRICTION APPLIED AT THE TIME OF SENDING
▷ ON

PRINT FUNCTION RESTRICTION APPLIED AT THE TIME OF STORING IMAGE TO REMOVABLE MEDIUM
▷ ON 2902    2901

RETURN    EXECUTE

SYSTEM STATUS / SUSPEND

USER MODE
( PRINT FUNCTION RESTRICTION SETTING AT THE TIME OF
STORING IMAGE TO REMOVABLE MEDIUM )

| | | |
|---|---|---|
| · COPY-FORGERY-INHIBITED PATTERN PRINT | ON | OFF |
| · PAGE PRINT | ON | OFF |
| · DATE PRINT | ON | OFF |
| · STAMP PRINTING | ON | OFF |

CANCEL    OK

SYSTEM STATUS / SUSPEND

CONCENTRATED DOTS
(LARGE DOTS)

DISPERSED DOTS
(SMALL DOTS)

IMAGE PROCESSING APPARATUS AND METHOD HAVING COPY-FORGERY-INHIBIT FUNCTIONALITY

BACKGROUND OF THE INVENTION

1. Field of the Invention

The present invention relates to an image processing apparatus with a print function and to an image processing method.

2. Description of the Related Art

A shared MFP, which is connected to a network and used by a plurality of users, has a function of converting scanned image data into a file format and sending the data to a designated network address via the network (in the following, called a "Send" function). For example, refer to Japanese Patent Laid-Open No. H11-146119.

Also, for the purpose of avoiding network overload and the danger of data interception on the network, a system for exchanging data in file formats such as PDF and TIFF among devices (including information processing device such as personal computer) that is becoming increasingly popular is implemented by connecting a portable medium (for example, USB memory) to a Universal Serial Bus (USB) port of an image forming apparatus and then making the USB memory accessible.

Also, for the purpose of curbing unauthorized forgery and information leakage due to important documents being copied, images, such as a copy-forgery-inhibited pattern, which is a special background image or text that appears when documents are copied, or a copy number, are merged on the background of the documents, which achieves the effects of curbing the copying of the original documents.

However, in such a data exchange that uses the "Send" function and the USB memory, the security for images is as yet far from sufficiently prepared. For example, since the application of the copy-forgery-inhibited pattern and the like are processes carried out upon printing, when executing the "Send" function and when writing to USB memories, which do not involve the print function, the original image can be acquired as-is.

SUMMARY OF THE INVENTION

An object of the present invention is to apply a print function restriction setting, even if an output process that does not involve printing of image data using the print function is designated.

According to one aspect of the present invention, there is provided an image processing apparatus with a print function, the apparatus comprising: a determination unit configured to determine, when an output process that does not involve printing by a print function is designated for image data, whether or not a print function restriction setting is to be applied, based on a setting for the output process; and a merging process unit configured to merge the image data with a predetermined image when the determination unit has determined that the print function restriction setting is to be applied.

According to another aspect of the present invention, there is provided an image processing method that is carried out in an image processing apparatus with a print function, the method comprising: determining, when an output process that does not involve printing by the print function is designated for image data, whether or not a print function restriction setting is to be applied, based on a setting for the output process; and merging the image data with a predetermined image when a determination is made that the print function restriction setting is to be applied in the determining step.

Other objects of the present invention will be more apparent from the following detailed description of the present invention with reference to the attached drawings.

Further features of the present invention will become apparent from the following description of exemplary embodiments (with reference to the attached drawings).

BRIEF DESCRIPTION OF THE DRAWINGS

FIG. 20 is a diagram illustrating an example of a user interface screen for selecting items to which a print function restriction setting is applied.

FIG. 21 is a diagram illustrating an example of a user interface screen for setting conditions when "exception applicable" is ticked.

FIG. 23 is a diagram illustrating a merged image when a print function restriction is applied to an image at the time of Sending.

FIG. 27 is a diagram illustrating an example of a user interface screen for a user to designate a box number for the transfer/copy origin.

FIG. 28 is a diagram illustrating an example of a user interface screen for a user to designate a transfer/copy origin document.

FIG. 29 is a diagram illustrating an example of a user interface screen for a user to perform a print restriction setting for transferring/copying.

DESCRIPTION OF THE EMBODIMENTS

Preferred embodiments for carrying out the present invention shall be described in detail hereinafter with reference to the drawings. A network-connectable multi-function peripheral device (MFP) that has multi-functions (multifunctional) such as printing, copying, fax transmission, scanning, and so on is used as an example in the description of this embodiment.

Figure 1:
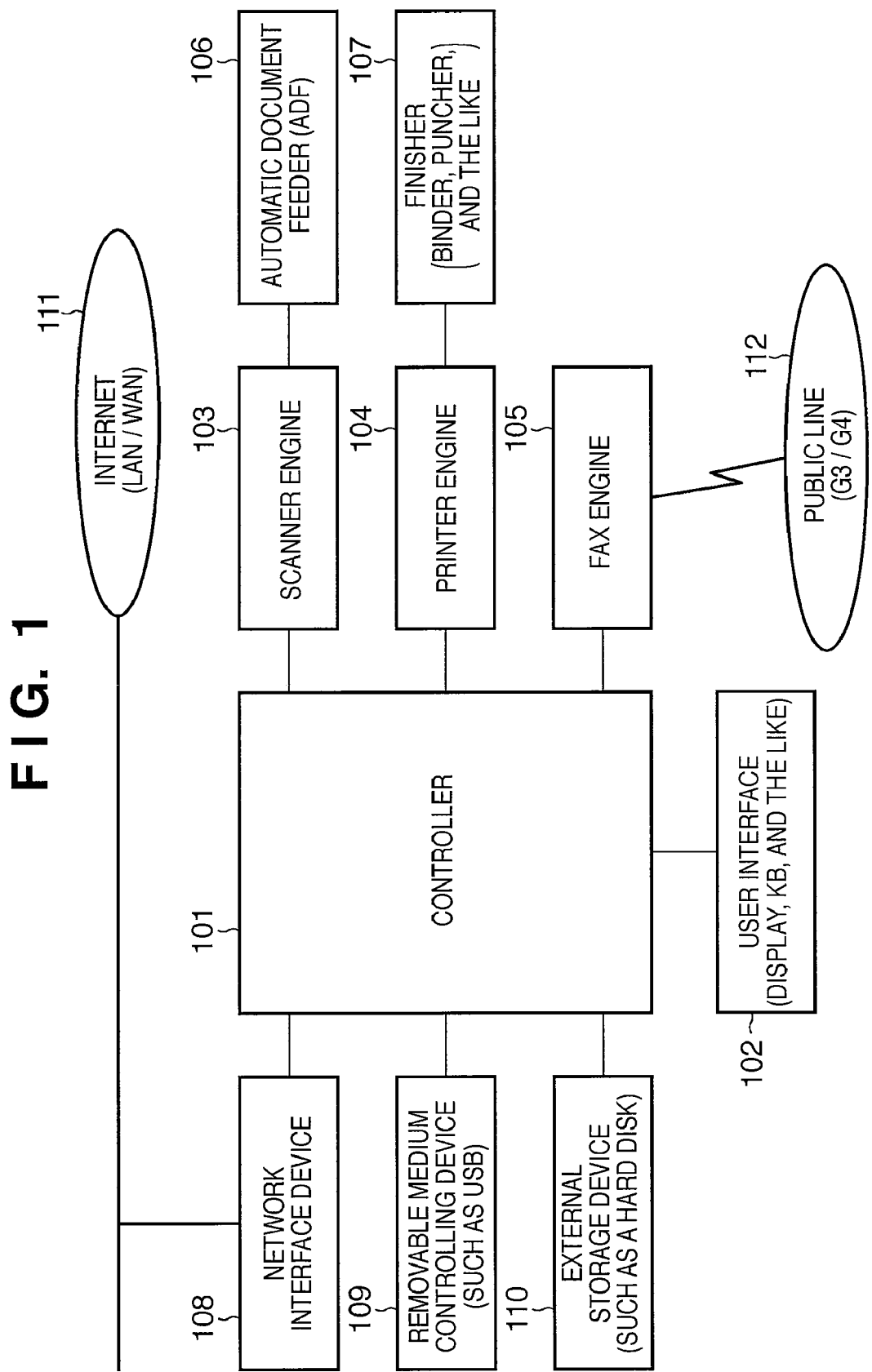
FIG. 1 is a diagram illustrating a hardware configuration of a multi-function peripheral device (MFP) as an example of an image processing apparatus in an embodiment of the present invention.

FIG. 1 is a diagram illustrating a hardware configuration of a multi-function peripheral device (MFP) as an example of an image processing apparatus in this embodiment. As shown in FIG. 1, the MFP includes a controller 101, a user interface 102, a scanner engine 103 with an automatic document feeder 106, a printer engine 104 with a finisher 107, and a fax engine 105. Further, a network interface device 108, a removable medium controlling device 109, and an external storage device 110 are included.

The controller 101 controls the user interface 102, the scanner engine 103, the printer engine 104, and the fax engine 105. The controller 101 also controls the automatic document feeder 106, the finisher 107, the network interface device 108, the removable medium controlling device 109, and the external storage device 110.

The user interface 102 is configured to include a CRT or liquid crystal display, a keyboard, a mouse, a touch panel, and the like. The touch panel is a key input unit provided on a display.

The scanner engine 103 reads an image on a document optically using an image sensor such as a CCD, and outputs image data after a photoelectric conversion. A document of several pages can be read as the automatic document feeder 106 automatically feeds the document.

The printer engine 104 is an engine unit of, for example, a laser beam printer, and records image data and the like from the scanner engine 103 onto a recoding medium such as a paper. The finisher 107 is capable of collectively carrying out a stapling process and a bookbinding process of the document outputted by the printer engine 104.

The fax engine 105 is a unit that carries out a G3 facsimile transmission based on, for example, the recommendations of the ITU, and is capable of sending image data and the like from the scanner engine 103 via a public line 112. "ITU" is an acronym for "International Telecommunication Union Telecommunication Standardization Sector".

The network interface device 108 is connected to the Internet 111 via an Ethernet cable, and is capable of accepting a print-job (PDL-job) sent from another MFP or information processing device (PC) on a LAN/WAN, and sending image data and the like from the scanner engine 103.

The removable medium controlling device 109 is, for example, a USB interface, and controls reading and writing of image data to a portable medium, which is both removable and easy to transport. The image data stored in a portable medium is printed by the printer engine 104 or sent via fax by the fax engine 105. The image data and the like from the scanner engine 103 are recorded in a portable medium.

The external storage device 110 is, for example, a hard disk, and stores various control programs and control information controlled by the controller 101, images to be requested to be printed by the printer engine 104, image data from the scanner engine 103, and so on.

Figure 2:
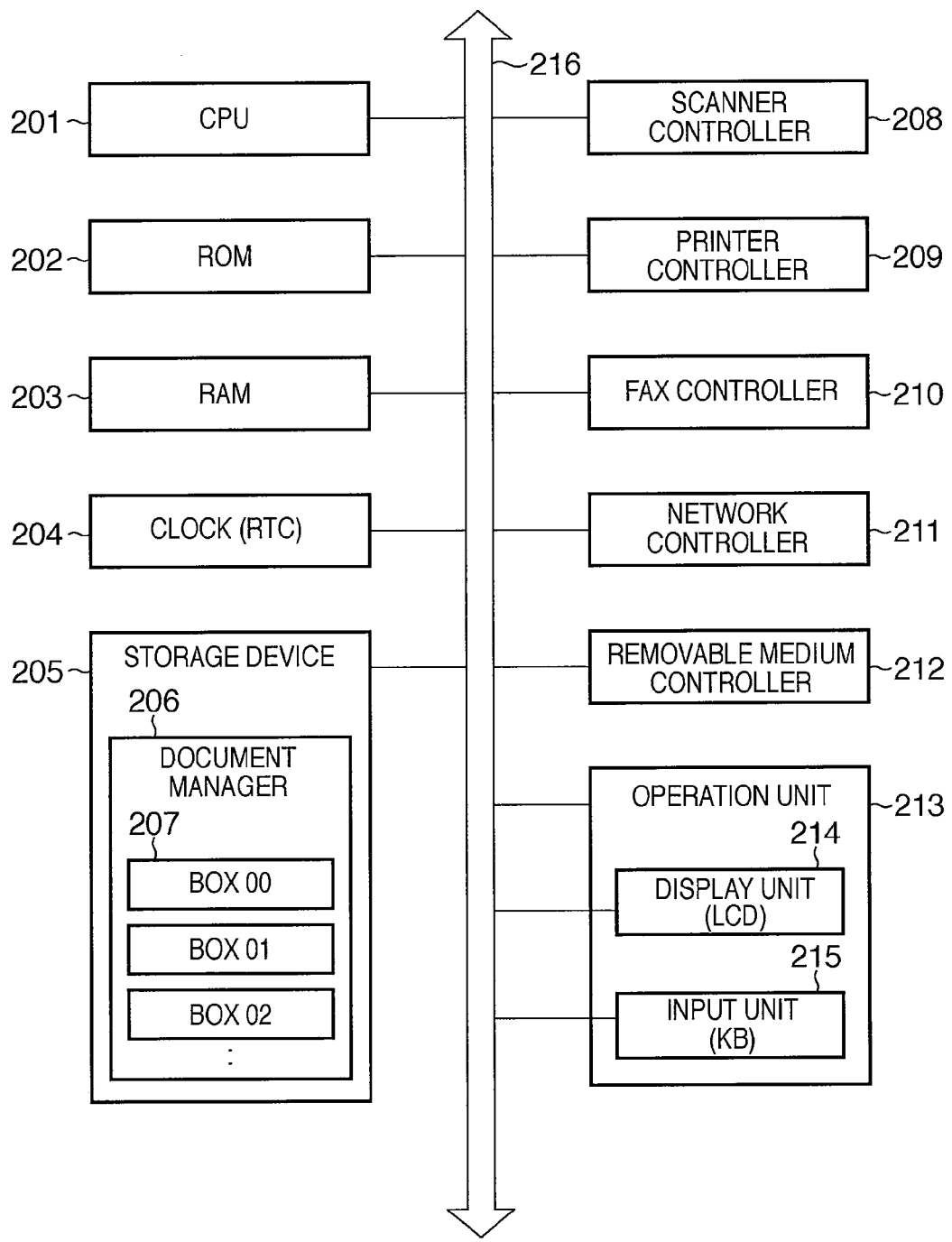
FIG. 2 is a diagram illustrating an internal configuration of a controller 101 shown in FIG. 1.

FIG. 2 is a diagram illustrating an internal configuration of a controller 101 shown in FIG. 1. As shown in FIG. 2, a CPU 201, a ROM 202, a RAM 203, a clock (RTC) 204, and a storage device (HDD) 205 are connected to a system bus 216. A scanner controller 208, a printer controller 209, a fax controller 210, a network controller 211, a removable medium controller 212, and an operation unit 213 are also connected to the system bus 216.

The CPU 201 is a central processing unit that carries out various commands according to a control program or control data stored in the ROM 202, the RAM 203, and the storage device (HDD) 205. The ROM 202 stores various programs and control data for the CPU 201 to carry out the commands. The RAM 203 is a main memory controlled by the CPU 201, and stores data and programs necessary for various controls.

The clock (RTC) 204 is a real time clock that carries out time management of the whole system. The storage device (HDD) 205 controls access to the external storage device 110, and includes a document manager 206 for managing a plurality of internal boxes 207.

The scanner controller 208 controls the scanner engine 103. The printer controller 209 controls the printer engine 104. The fax controller 210 controls the fax engine 105. The network controller 211 controls the network interface device 108. The removable medium controller 212 controls the removable medium controlling device 109. The operation unit 213 controls the user interface 102, and is configured to include a display unit 214 and input unit 215.

Figure 3:
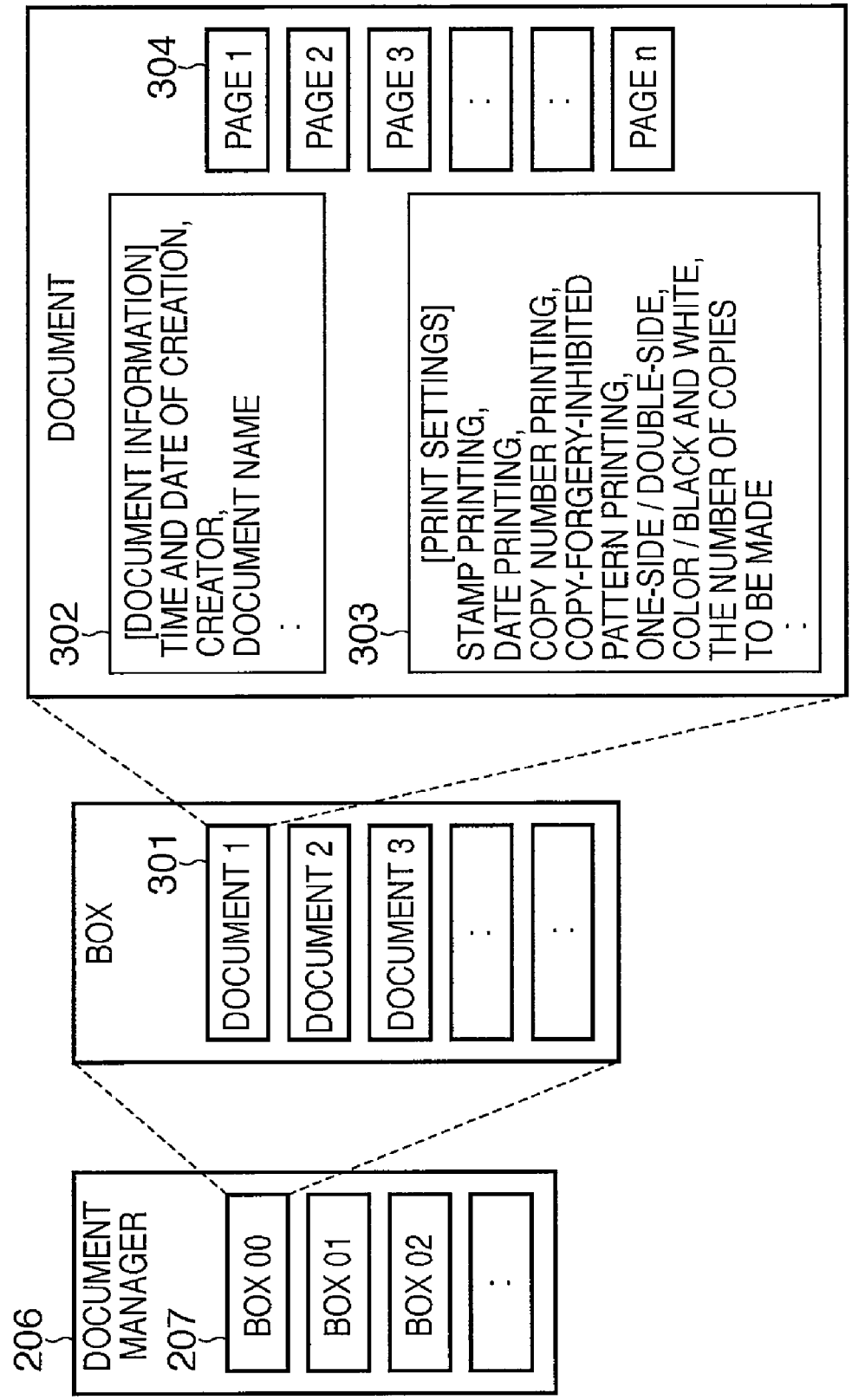
FIG. 3 is a diagram illustrating details of a document manager 206 included in a storage device 205 for carrying out a box function.

FIG. 3 is a diagram illustrating details of the document manager 206 included in the storage device 205 for carrying out a box function. As shown in FIG. 2, a plurality of boxes 207 are registered in the document manager 206.

The boxes 207 are capable of storing a plurality of documents 301. Each box can be allocated to each user, group, or section in a company, and access can be restricted by a password.

The document 301 includes document information 302, print settings 303, and pages 304. In the document information 302, information related to the document such as time and date the document is created, a creator of the document, and a document name is stored.

The print settings 303 store information related to printing such as various settings of the merging system (stamp printing, date printing, copy number printing, copy-forgery-inhibited pattern printing), one side/double side copy distinction, color/black and white printing, the number of copies to be made, and so on.

In the pages 304, actual images are stored, and one document is configured of images numbering from one page to a plurality of pages.

Next, a process by which the controller 101 of the MFP stores a document in the box 207 is described with reference to FIG. 4 to FIG. 6. First, a process for storing an image written in PDL forwarded from the host computer is described with reference to FIG. 4.

Figure 4:
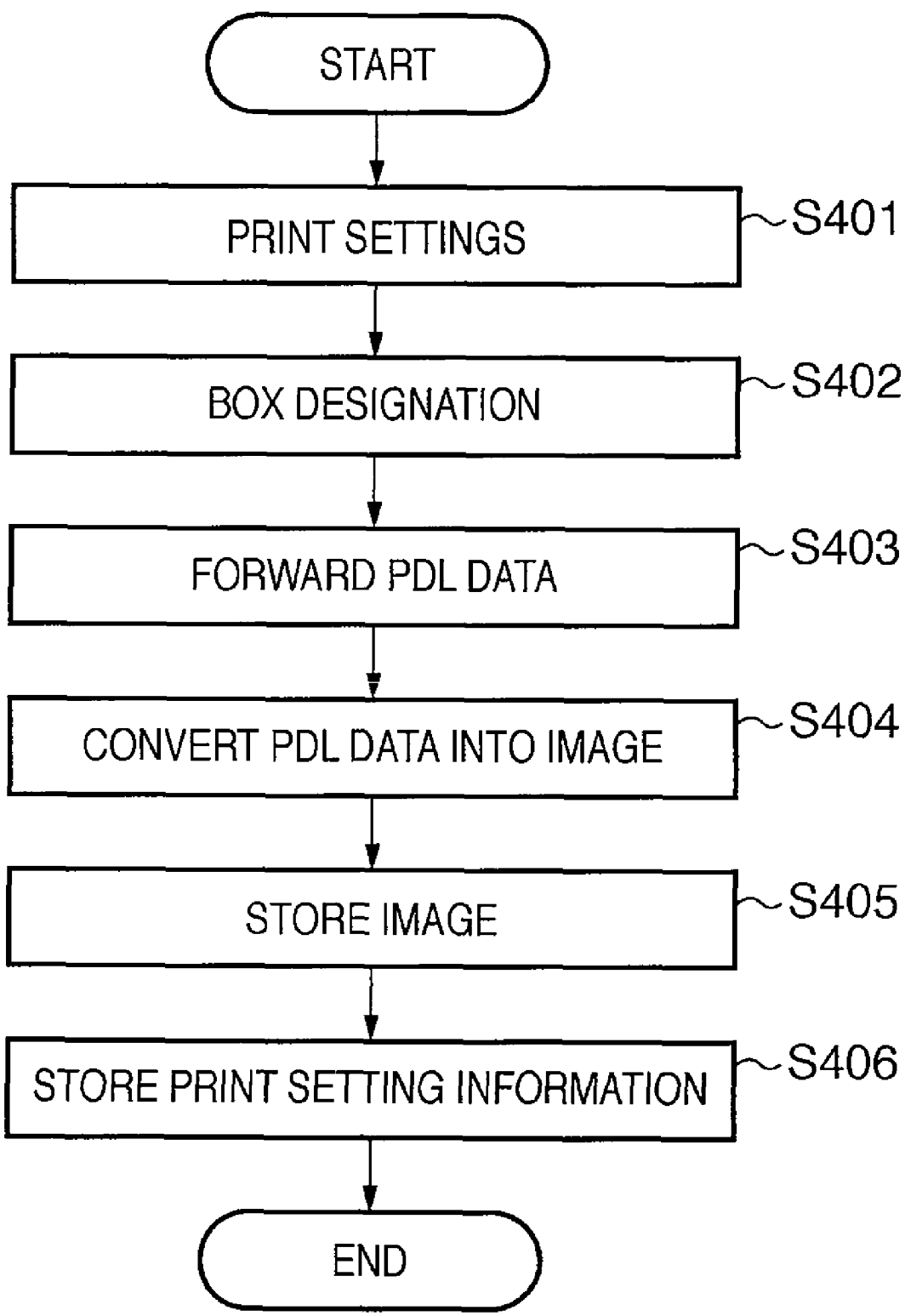
FIG. 4 is a flowchart illustrating a process for registering a PDL data image forwarded from a host computer in a box.

FIG. 4 is a flowchart illustrating a process for registering an image written in PDL forwarded from the host computer in a box. First, in step S401, a user performs various print settings on the host computer connected via the Internet 111.

Such a print setting operation is carried out using a user interface screen provided by a printer driver activated by the host computer, and because this is public knowledge, descriptions thereof shall be omitted. Here, various print settings to be processed by the printer engine 104, such as the number of the copies to be made, the output paper size, whether to print on one-side or double-side, and so on, are specified.

Then, in step S402, the user designates to which box managed by the document manager 206 of the MFP the image taken from the host computer is to be stored, using a number. As shown in FIG. 5, the number 00 being designated indicates that the document is to be stored in box 00. FIG. 5 is a diagram illustrating an example of a user interface screen for designating the box number for storing the document.

Then, in step S403, print data is forwarded from the host computer to the MFP via the Internet 111 and the network interface device 108. The printer driver installed in the host computer converts code data of the print target to page description language (PDL). Then, the data is sent along with the print setting data set in step S401.

Then, in step S404, the PDL data is developed into a print image (rasterized). Then, in steps S405 and S406, the document 301 is produced. First, in step S405, the print image is stored in the page 304. Then, in step S406, after keeping the print setting data set in step S401 and forwarded in step S403 in the print settings 303, the document information 302 is written in.

Next, a process for registering a document image scanned by the MFP in a box is described with reference to FIG. 6.

Figures 5, 6:
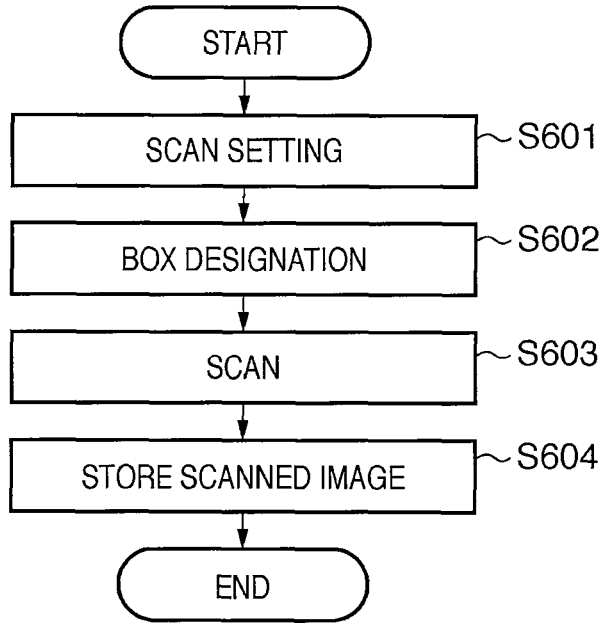
FIG. 5 is a diagram illustrating an example of a user interface screen for designating a box number for storing a document.
FIG. 6 is a flowchart illustrating a process for registering a document image in a box by a scan job.

FIG. 6 is a flowchart illustrating a process for registering a document image in a box by a scan job. First, in step S601, the user sets a scan function necessary for the process via the operation unit 213 of the user interface 102. Then, in step S602, a box number, indicating the box to which the image data of the document to be stored, is designated via the operation unit 213. The box number designation is carried out on the user interface screen shown in FIG. 5.

Then, in step S603, a scan start command is made to the scanner engine 103. Then, in step S604, the image data read by the scanner engine 103 is stored in the page 304 of the document 301 of the box 207 designated in step S602. Afterwards, upon reading the entire document placed in the automatic document feeder 106, the document information 302 is written in. In the case of a scanned image, no information is stored in the print settings 303.

Next, a process for registering a copy image copied by the MFP in a box is described with reference to FIG. 7.

Figure 7:
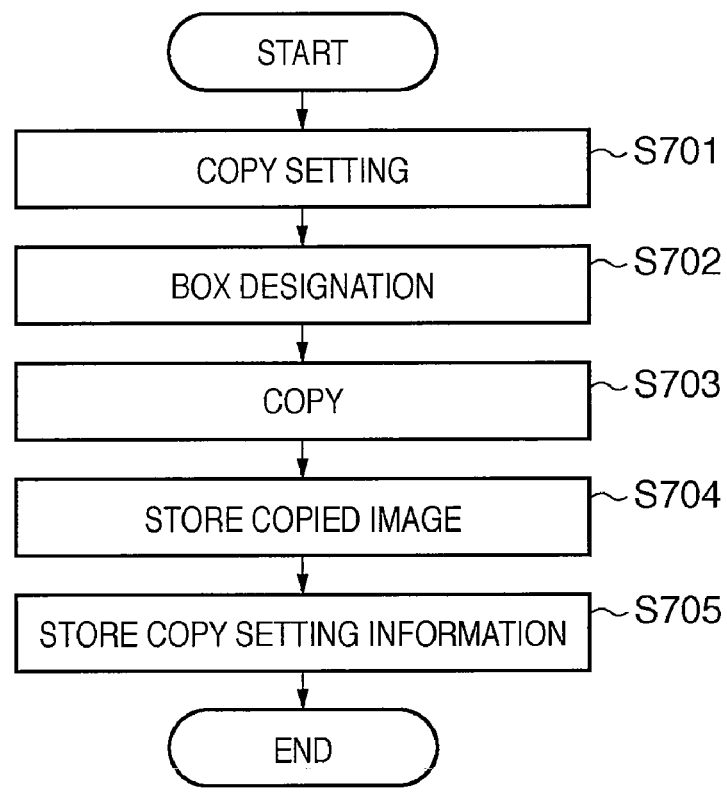
FIG. 7 is a flowchart illustrating a process for registering a copy image in a box by a copy job of a scanner engine 103 and a printer engine 104.

FIG. 7 is a flowchart illustrating a process for registering a copy image in a box by a copy job of the scanner engine 103 and the printer engine 104. First, in step S701, the user sets copy functions necessary for the process via the operation unit 213 of the user interface 102. Then, in step S702, a box number of a box to which the copy image is stored is designated via the operation unit 213. The box number designation is carried out using the user interface screen shown in FIG. 5.

Then, in step S703, a copy start command is made to the scanner engine 103 and the printer engine 104. Then, in step S704, the image data read by the scanner engine 103 and printed by the printer engine 104 is stored in the page 304 of the document 301 of the box 207 designated in step S702. Afterwards, upon reading the entire document placed on the automatic document feeder 106, in step S705, the document information 302 and the print settings 303 are written in.

Next, a process for sending the document 301 registered in the box 207 by a "Send" function is described with reference to FIG. 8.

Figure 8:
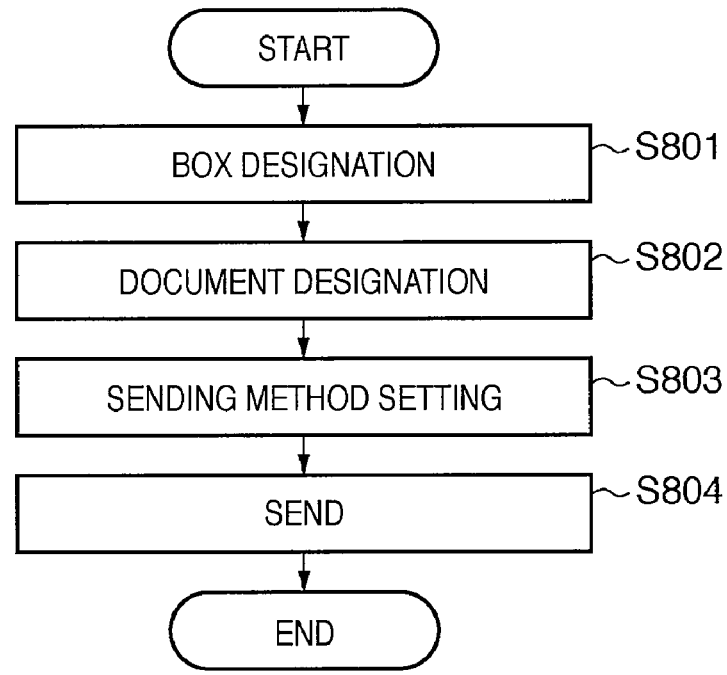
FIG. 8 is a flowchart illustrating a sending process for sending a document in the box to an external device.
Figure 9:
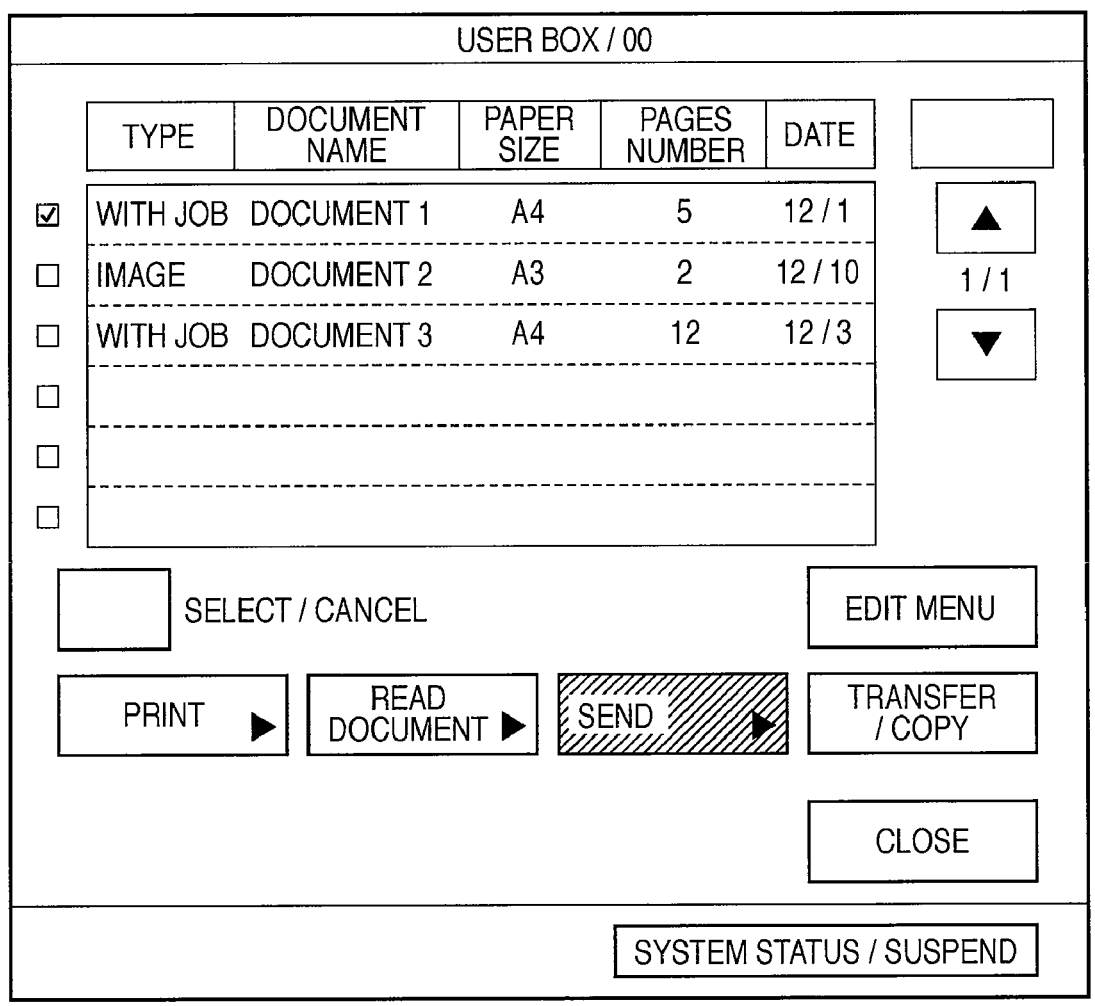
FIG. 9 is a diagram illustrating an example of a user interface screen for a user to select a document and send the document.

FIG. 8 is a flowchart illustrating a process for sending the document in the box to an external device. First, in step S801, the number of the box in which the document to be sent is stored is designated. The box number designation is carried out using the user interface screen shown in FIG. 5. Then, in step S802, the user selects the document to be sent and an operation (in this case, "send"). This selection of the document and the sending the document is carried out on the user interface screen shown in FIG. 9.

Figure 10:
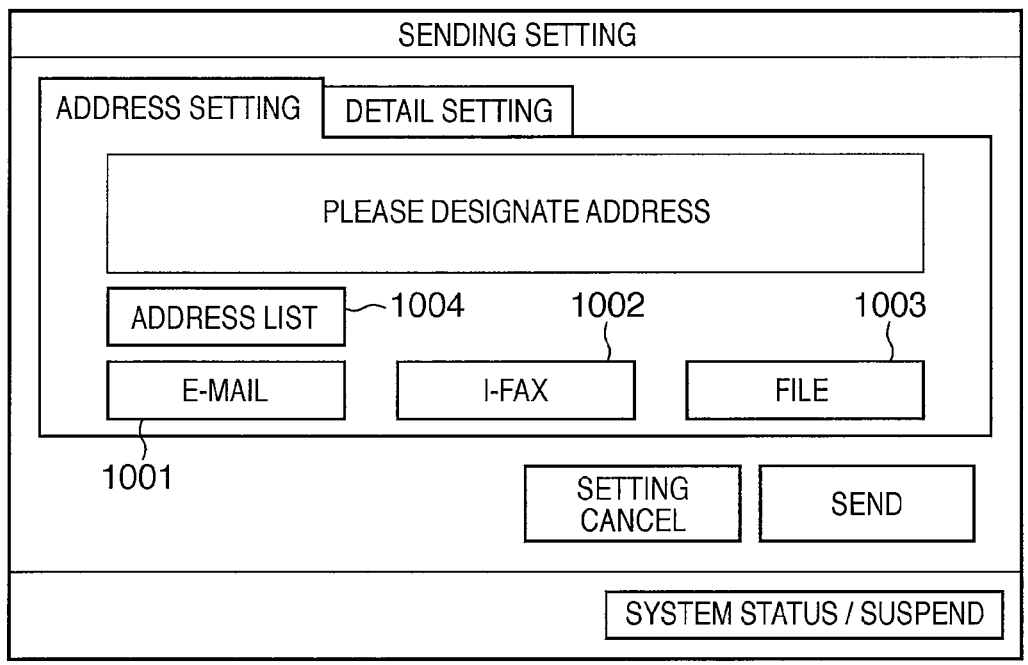
FIG. 10 is a diagram illustrating an example of a user interface screen for a user to set a sending method.

Then, in step S803, user sets a sending method for the document to be sent. This sending method setting is carried out on the user interface screen shown in FIG. 10. The sending method is selected from an e-mail 1001, an I (Internet) fax (details of which are omitted since they are known from, for example, RFC) 1002, and a file (a forward method using, for example, SMB or FTP) 1003. The destination is inputted in an address table 1004.

Figure 11:
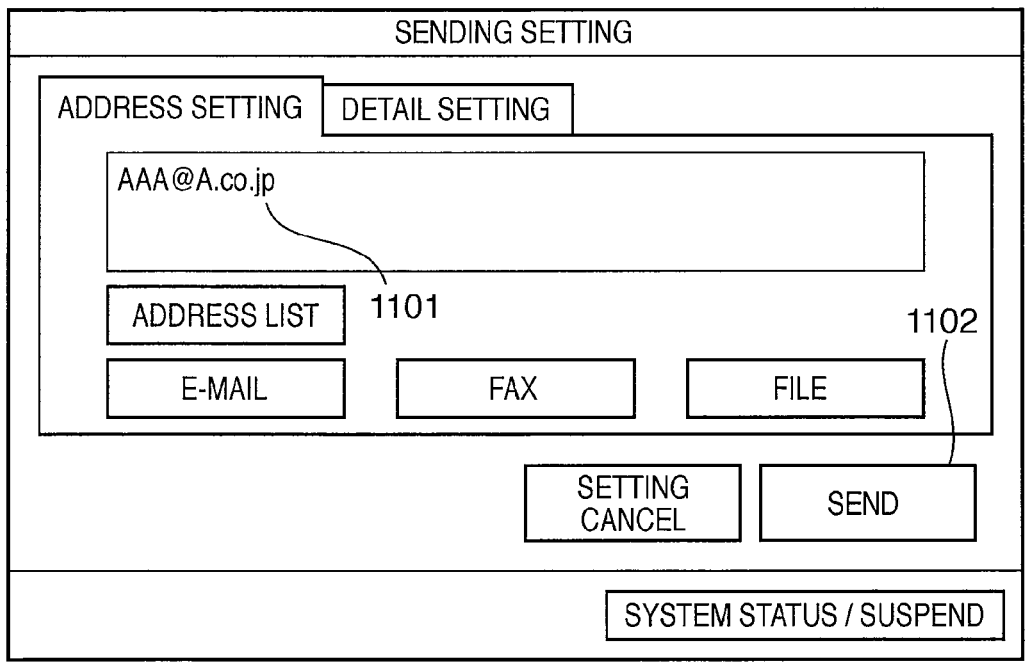
FIG. 11 is a diagram illustrating an example of a user interface screen in which an address to which the document is to be sent is set.

Then, in step S804, the document selected in the aforementioned steps S801 to S803 is sent to the address. FIG. 11 is a diagram illustrating an example of a user interface screen in which an address to which the document is to be sent is set. In the example shown in FIG. 11, AAA@A.co.jp 1101 is set as an address, and when a send button 1102 is pressed, the document is sent to an external device via the network interface device 108 and the Internet 111 from the MFP.

Next, a process for printing the document 301 registered in the box 207 by the print function is described with reference to FIG. 12.

Figure 12:
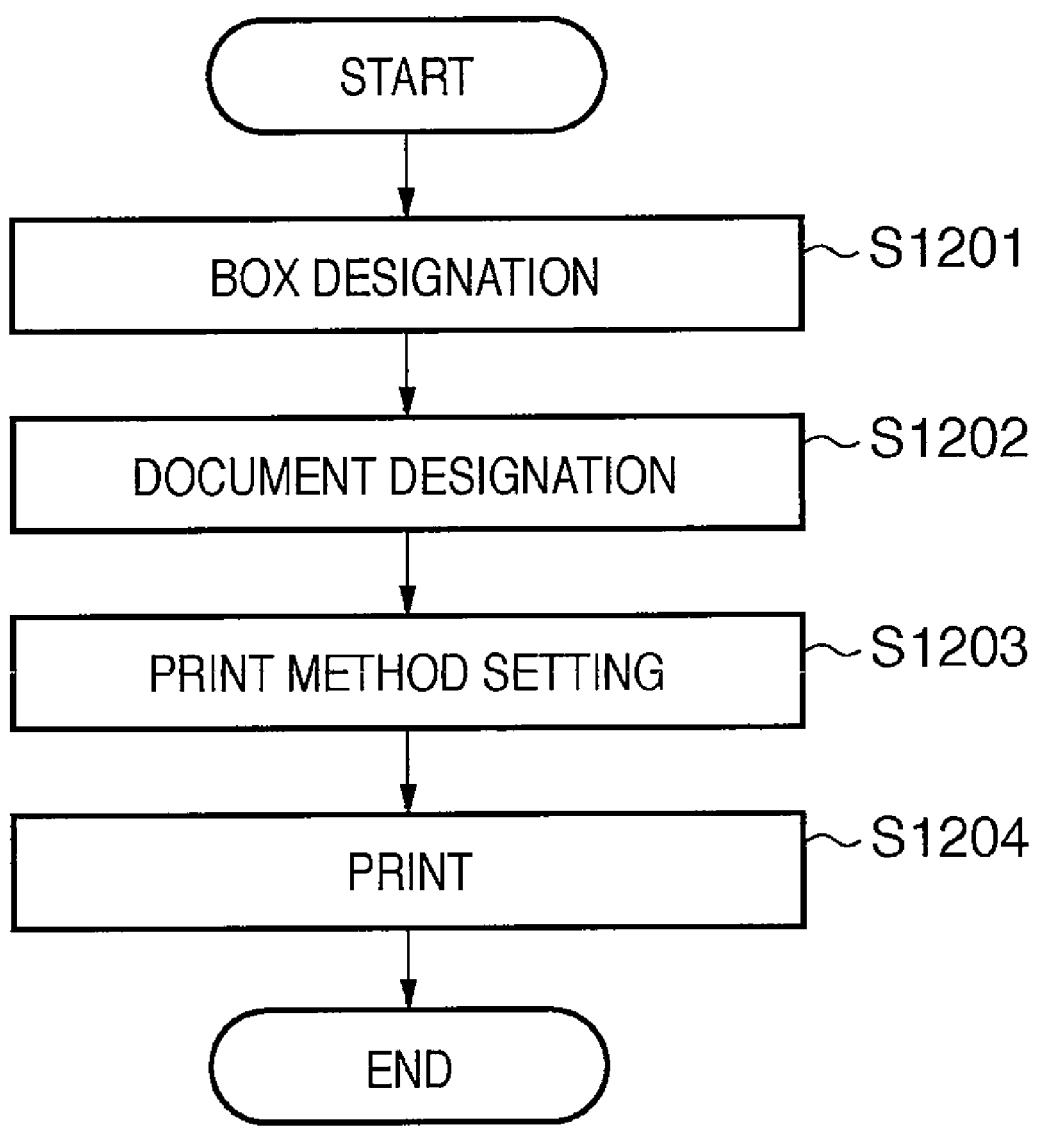
FIG. 12 is a flowchart illustrating a print process for printing the document registered in the box.
Figure 13:
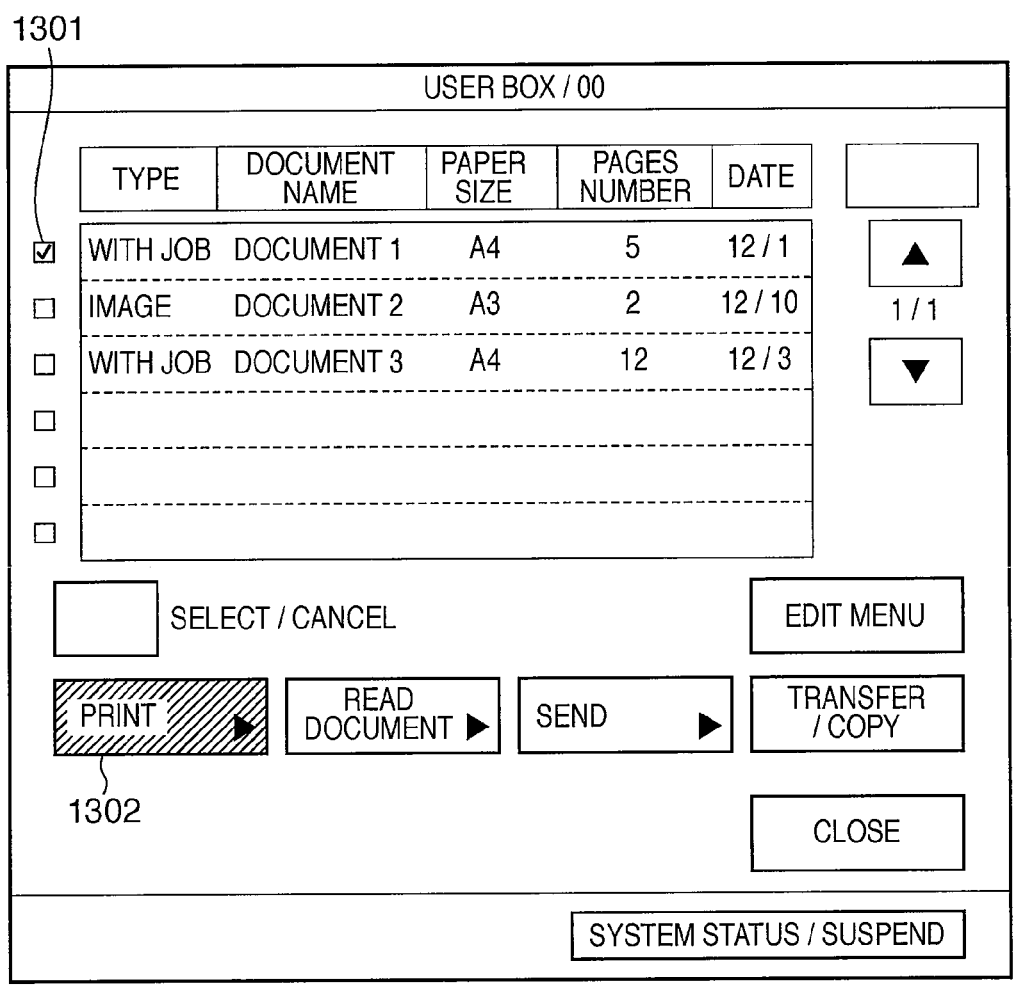
FIG. 13 is a diagram illustrating an example of a user interface screen for a user to select a document and Print.

FIG. 12 is a flowchart illustrating a print process for printing the document registered in the box. First, in step S1201, the number of the box in which the document to be printed is stored is designated. The box number designation is carried out on the user interface screen shown in FIG. 5. Then, in step S1202, the user selects the document to be printed and a work (in this case, "print"). This document and print selection is carried out on the user interface screen shown in FIG. 13. In the example shown in FIG. 13, a document 1301 is selected, and a "print" button 1302 is pressed.

Figure 14:
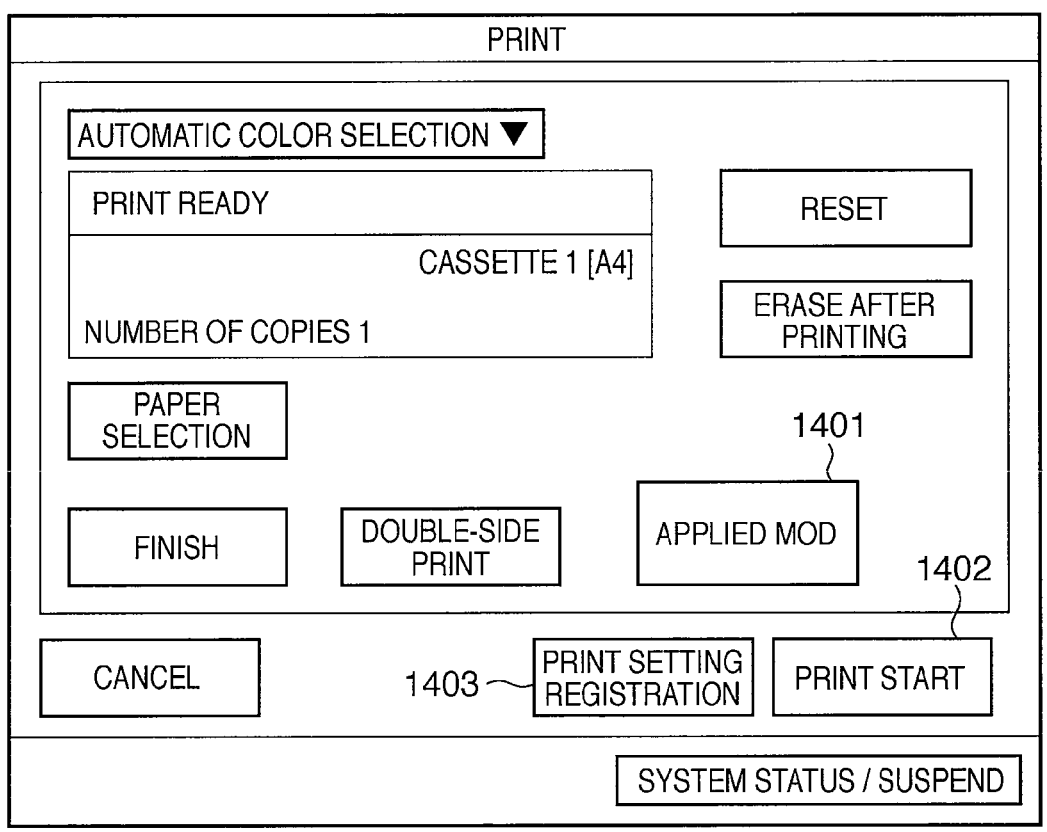
FIG. 14 is a diagram illustrating an example of a user interface screen for a user to set a print method.

Then, in step S1203, user sets a print method for the document. This print method setting is carried out on the user interface screen shown in FIG. 14. On this screen, the print settings 303 set to the document and the paper on which the document is printed are checked, and the processes to be carried out by the finisher 107 are reset.

Figure 15:
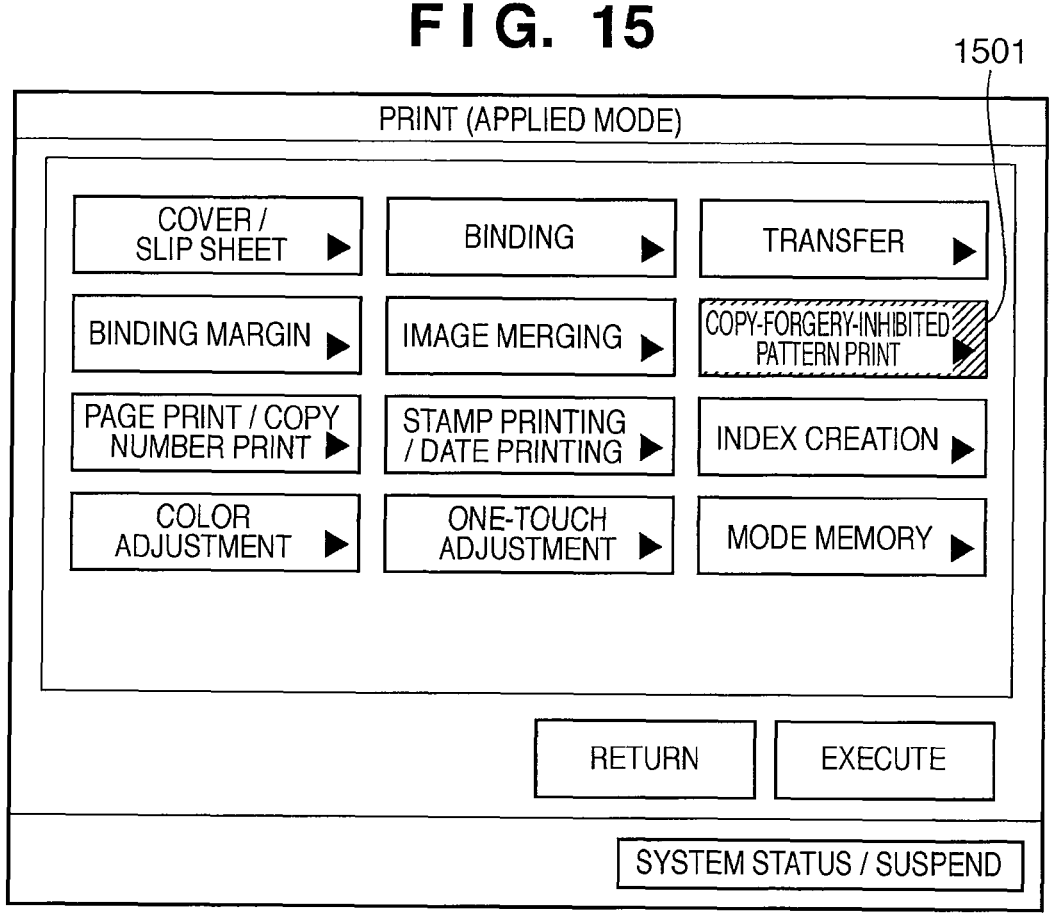
FIG. 15 is a diagram illustrating an example of a user interface screen for a user to check and change print settings.

The details of the processes for the image merging carried out at the time of printing can be checked by pressing an "applied mode" button 1401. When the "applied mode" button 1401 is pressed, a user interface screen shown in FIG. 15 is displayed, so that checking and changing the print settings 303 set to the document can be changed. A copy-forgery-inhibited pattern print, which is to be described in later in detail, is set in the document.

Figure 16:
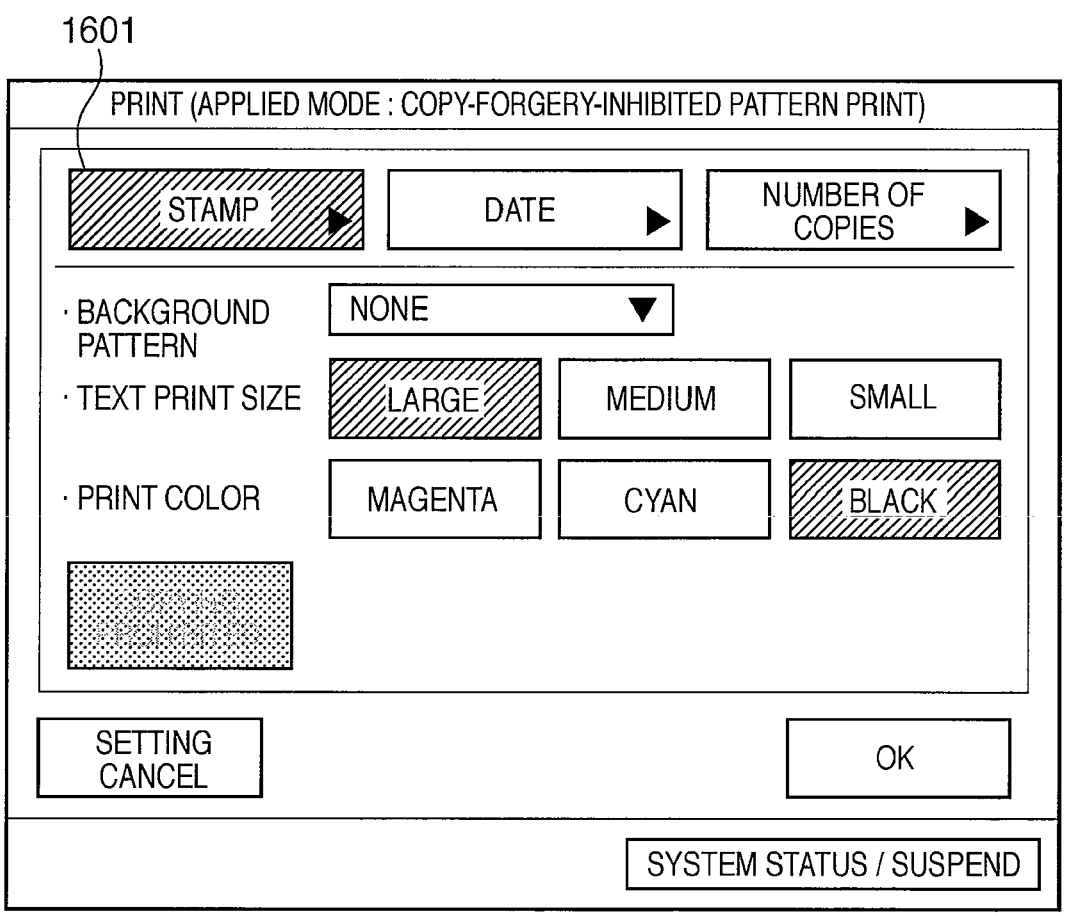
FIG. 16 is a diagram illustrating an example of a user interface screen for a user to check details and change the setting.

When a "copy-forgery-inhibited pattern print" button 1501 shown in the screen of FIG. 15 is pressed, a user interface screen shown in FIG. 16 is displayed. The details are checked and the settings are changed on this screen. A stamp 1601 is set as a background image, and details, such as that the print size is set to large, the color is set to black, and the image to be stamped is set to "Copying Prohibited", can be checked. When there is no problem with the displayed details (setting details), an "OK" button 1602 is pressed. By the pressing of the "OK" button 1602, the screen goes back to the one shown in FIG. 14.

Then, referring back to FIG. 12, in step S1204, the document selected in the aforementioned steps S1201 to S1203 is printed by the printer engine 104 according to the print settings. To be specific, on the screen shown in FIG. 14, when there is no problem with each of the settings, a print command is sent to the printer engine 104 by pressing a "print start" button 1402 at the bottom of the screen. The print settings 303 are updated by pressing a "print setting registration" button 1403, after which this process is terminated.

Figure 17:
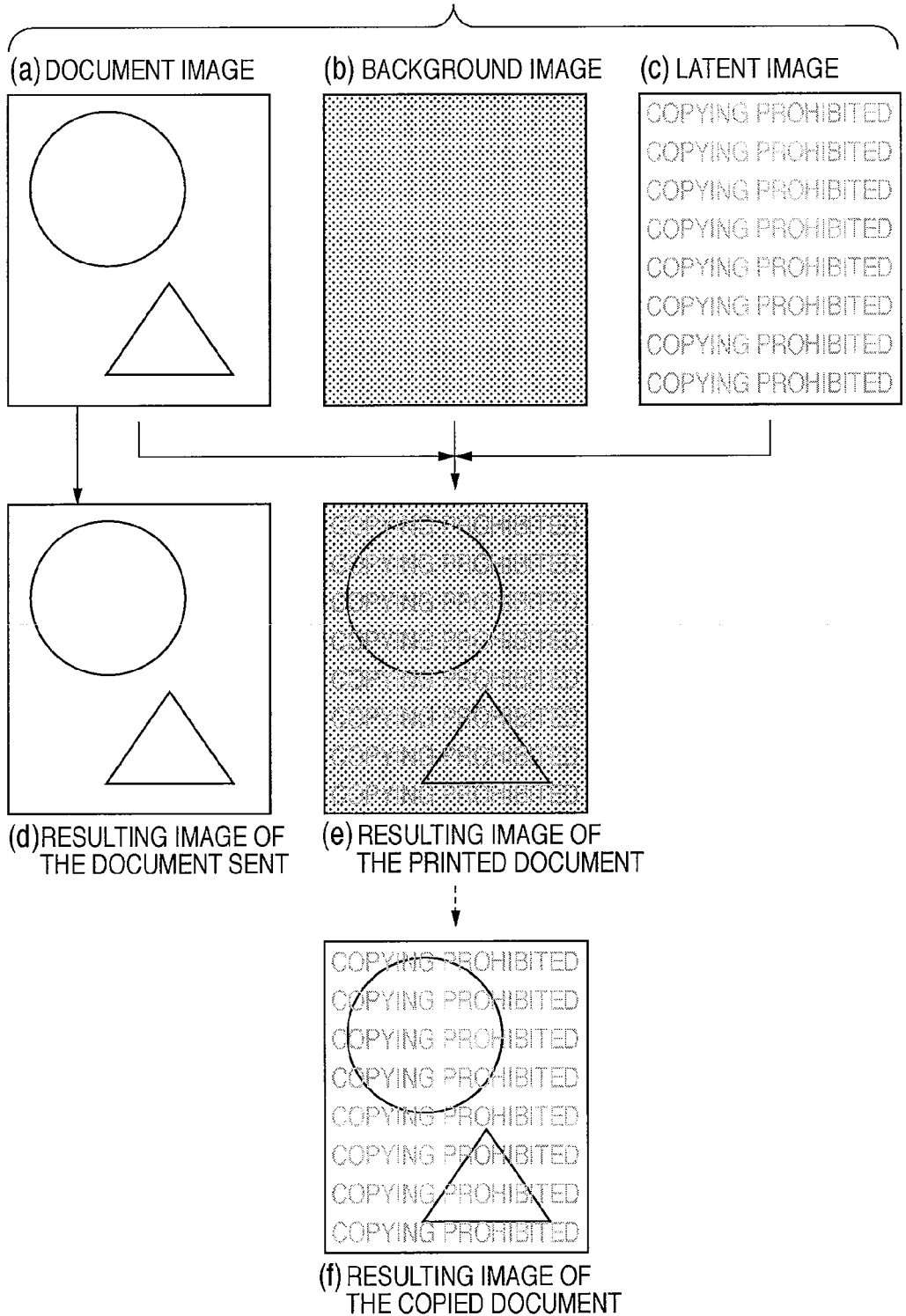
FIG. 17 is a diagram illustrating a summary of the flow from image to image (that is, the combination of images) in an image merging process.

FIG. 17 is a diagram illustrating a summary of the flow from image to image (that is, the combination of images) in the image merging process. (a) shown in FIG. 17 illustrates a document image, and corresponds to an image in a page of a document. (b) illustrates a background image, which is automatically determined by selecting "copy-forgery-inhibited pattern print" 1501 on the screen shown in FIG. 15. Several background images may be prepared, and a single image may be selected therefore, or various settings, such as the print darkness, may be made available for adjustment. The background image shown in (b) is an image that disappears at the time of copying (that is, is not copied), but the scope of the present invention is not limited thereto, and a latent image may be printed lightly so as to stand out at the time of copying. (c) is a latent image, and is formed based on the details set on the screen shown in FIG. 16.

The copy-forgery-inhibited pattern using the above-described background image and the latent image is configured as follows. The background image is also referred to as a background portion, and a latent image portion is also referred to as a latent image.

Figures 30, 31:
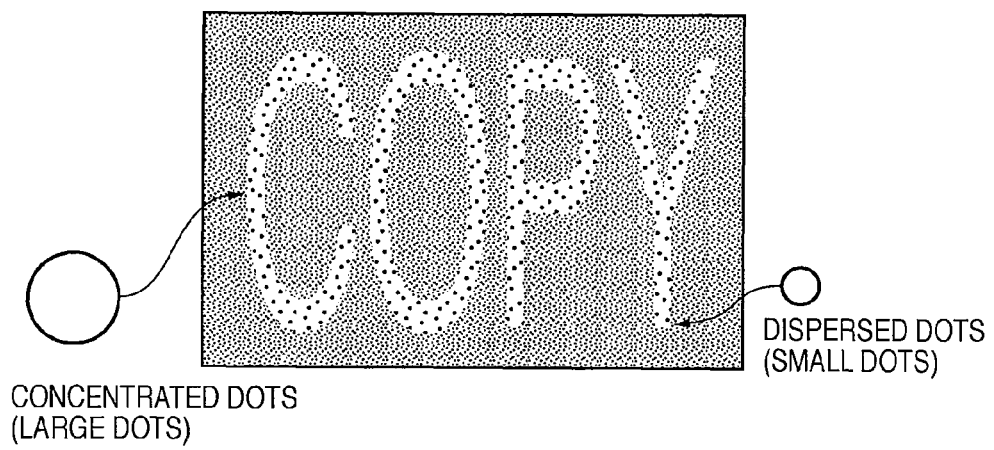
FIG. 30 is a diagram illustrating an example of a user interface screen for selecting an item to which the print function restriction setting is applied.
FIG. 31 is a diagram illustrating a status of dot in a copy-forgery-inhibited pattern image.

FIG. 31 is a diagram illustrating an appearance of a copy-forgery-inhibited pattern image as an example. The copy-forgery-inhibited pattern image is composed of a background portion in which dots are dispersed throughout a predetermined region and a latent image portion in which dots are concentrated within a predetermined region. The dots within these two regions can be generated through halftone processes, dithering processes, and the like that differ from one another. For example, when generating a copy-forgery-inhibited pattern image using halftone processing, a halftone process that utilizes low lines per inch in the latent image portion is carried out. Meanwhile, it is preferable to carry out a halftone process that applies high lines per inch to the background portion. Furthermore, when generating a copy-forgery-inhibited pattern image using a dithering process, it is preferable to carry out a dithering process using a dot-concentrated dithering matrix on the latent image portion and carry out a dithering process using a dot-dispersed dithering matrix on the background portion.

The copy-forgery-inhibited pattern image shall be described. The copy-forgery-inhibited pattern image is configured to include a region "left" on a duplicate and a region that "disappears" (or "is lighter than the left region"). The reflection densities in these two regions are substantially the same on the original document. Therefore, texts such as "COPY" that have been embedded are unrecognizable to the human eye.

The "left" herein refers to the case where the image in the original document is accurately reproduced on the duplicate. "Disappears" refers to the case where the image in the original document is not reproduced on the duplicate. The reflection density is determined by a reflection density meter.

In the following, the region "left" in the duplicate is called a "latent image portion", and the region that "disappears" (or "is lighter than the region left") on the duplicate is called a "background portion".

FIG. 31 is a diagram illustrating a status of dot in a copy-forgery-inhibited pattern image as described above. In FIG. 31, the region arranged with concentrated dots is the latent image portion, and the region arranged with dispersed dots is the background portion. The dots in these two regions are produced by different halftone processing or different dither processing. For example, the dots in the latent image portion are produced by halftone processing with a low number of lines per inch, and the dots in the background portion is produced by halftone processing with a high number of lines per inch. The dots in the latent image portion may also be produced by a dot-concentrated dither matrix, or the dots in the background portion may also be produced by a dot-dispersed dither matrix.

Figure 32:
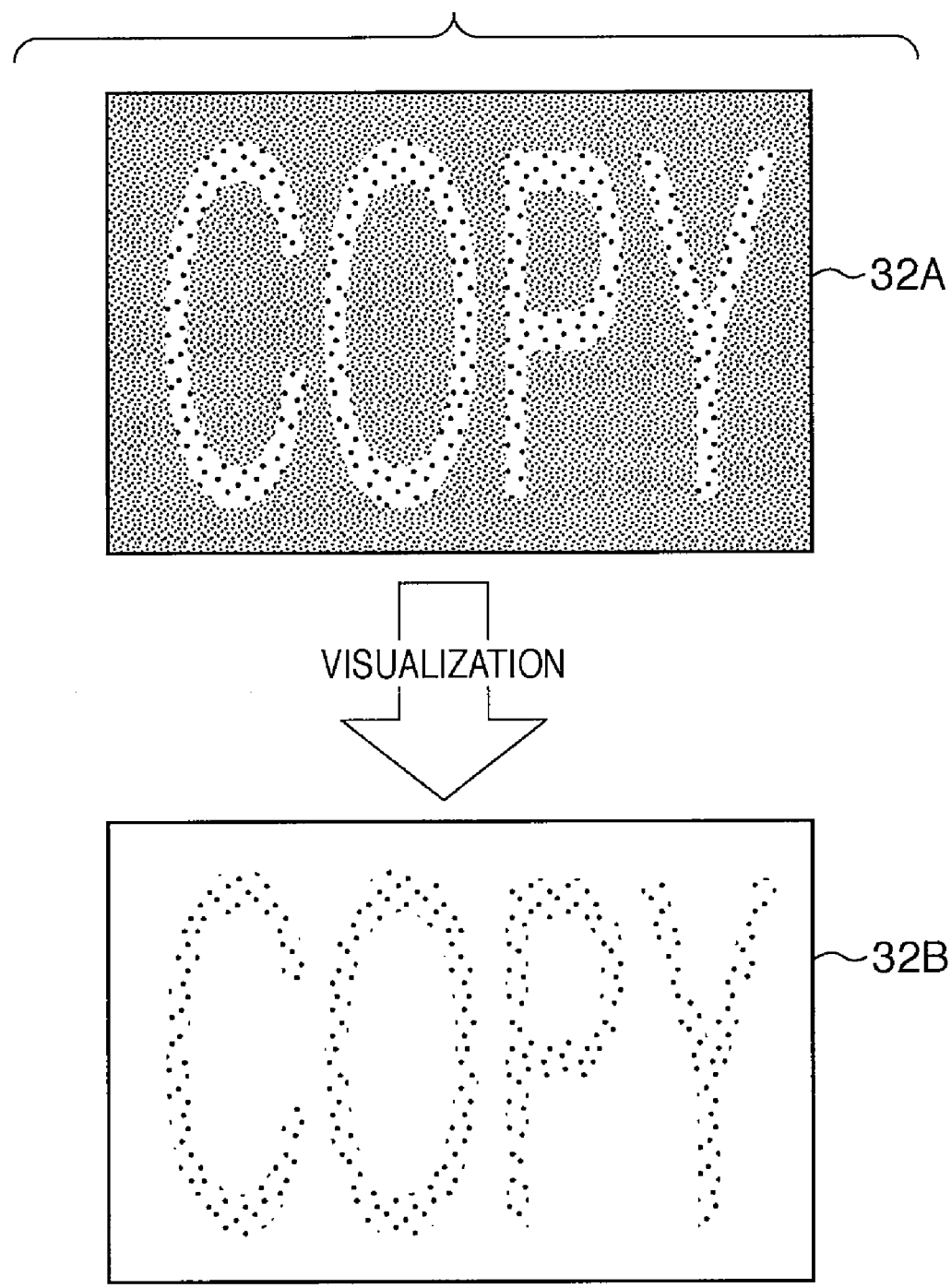
FIG. 32 is a diagram illustrating appearance of a document with a copy-forgery-inhibited pattern before and after copying as an example.

The reproduction capability of a copier depends on the input resolution and the output resolution of the copier. Therefore, there is a limitation on the reproduction capability of a copier. Thus, when the dots in the latent image portion are formed larger than the size of the dots reproducible by the copier, and the dots in the background portion are formed smaller than the size of the dots reproducible by the copier, the dots in the latent image portion are reproduced on the duplicate, but the dots in the background portion are not easily reproduced. As a result, on the duplicate, the latent image portion is reproduced darker or with more emphasis than the background portion. In the following, a state where the texts embedded as the latent image portion appear visually due to the latent image portion being reproduced at a darker level than the background portion in a duplicate is referred to as visualization (ref. FIG. 32).

FIG. 32 is a diagram illustrating such visualization. These diagrams conceptually show that the concentrated dots (large dots) are reproduced on the duplicate, and the dispersed dots (small dots) are not accurately produced on the duplicate.

The copy-forgery-inhibited pattern image is not limited to the above-described configuration, and may be configured to cause text such as the word "COPY", symbols, or patterns that can be recognized by humans to appear on the duplicate (visualization). Even if the text "COPY" is shown as knock-out characters on the duplicate, the copy-forgery-inhibited pattern image achieves the object. In this case as well, it goes without saying that the "COPY" region is called the background portion. The description of the copy-forgery-inhibited pattern image ends here.

There is generally a limit level on the reproduction capabilities of the scanning and image forming units of a copy machine. This limit level depends on the input resolution at which minute dots in an original document are scanned and the output resolution at which those minute dots are reproduced. When the dots in the background portion of the copy-forgery-inhibited pattern image are formed so as to be smaller than the limit level at which a copy machine can reproduce those dots, and the dots in the latent image portion of the copy-forgery-inhibited pattern image are formed so as to be larger than the stated limit level, the dots of the latent image portion are reproduced in the duplicate, whereas the small dots of the background portion are not reproduced.

Furthermore, some copiers are provided with a "background removal process" by which the dots of a low darkness region are not reproduced or reproduced with a curbed darkness to improve the legibility of the texts and diagrams of the copied document. When the "background removal process" determines the darkness by the unit of the copier's document reading resolution, the dots of large mass are determined as having a darkness of a certain level or more and then reproduced. On the other hand, minute dots are determined as below the certain level and not reproduced by the background removal, or reproduced with an even lower darkness than the original.

Using this characteristic makes the latent image appear in a duplicate in which the copy-forgery-inhibited pattern image has been duplicated. An image appearing in the duplicate shall be referred to as a visualized image hereinafter. Note that even if the background portion has been reproduced through the duplication, similar effects can be achieved as in the case where the dots are not reproduced, as long as the latent image portion is at a clearly-recognizable level in the duplicate.

FIG. 32 is a diagram illustrating appearance of a document with a copy-forgery-inhibited pattern before and after copying as an example. 32A is the "original" before copying, and is the same as the one shown in FIG. 31. On the other hand, 32B shows a "copied document" outputted by copying, in which the pattern in the background portion is not reproduced and has disappeared.

In the present invention, in the following, a print in which a document and a copy-forgery-inhibited pattern image is merged is called a copy-forgery-inhibited pattern print, but the copy-forgery-inhibited pattern print is not limited to the above configurations, and it is sufficient as long as the texts and the like are reproduced in the duplicate at a recognizable level. That is, even if the texts are designated as the background portion and shown as a reverse printing letters upon copying, the object of the copy-forgery-inhibited pattern print is achieved.

In an embodiment described hereinafter, a region in which a latent image is to be developed on a duplicate that is made by copying a print output having a copy-forgery-inhibited pattern image is called a latent image portion or a foreground portion. Furthermore, a region disappearing in the duplicate or appearing with a reduced darkness as compared to the latent image portion in the duplicate is called a background portion. The descriptions given hereinafter assume that text, an image, or the like is specified as the copy-forgery-inhibited pattern image, and that the text, image, or the like of the latent image portion that is visualized in the duplicate is reproduced at a greater darkness than the background portion so as to be recognizable.

However, copy-forgery-inhibited pattern image is not limited thereto. For example, an embodiment also can be achieved by setting text information or image information as the background portion and the region surrounding the background portion as the latent image portion, so that on the duplicate, the text information or the image information is expressed as knockout characters. Also, the type of the copy-forgery-inhibited pattern image and its production process, color, shape, and size may be arbitrarily set.

In a transmission by a conventional "Send" function, the document image (the image of the page in the document) as shown in (a) is sent as-is and therefore the image as shown in FIG. 17(d) is the image resulting from the transmission. Also, in the case of the print function as shown in FIG. 12, adding (a), (b), and (c) together will result in the image shown in (e) being printed; when this image is copied and outputted, the resulting image of the copy will be (f).

Generally, there are limitations on the image reproduction capabilities of copiers depending on the input resolution for reading out minute dots of a copy document and the output resolution for reproducing minute dots. When the minute dots that are over the image reproduction capability are present in the document, in the duplicate, the minute dots are not completely reproduced, and therefore in the copy result shown in (f), the minute dots are lost on the image formed.

Next, descriptions related to the restriction setting upon sending the document by using the "Send" function shall be given with reference to FIG. 18 to FIG. 21.

Figure 18:
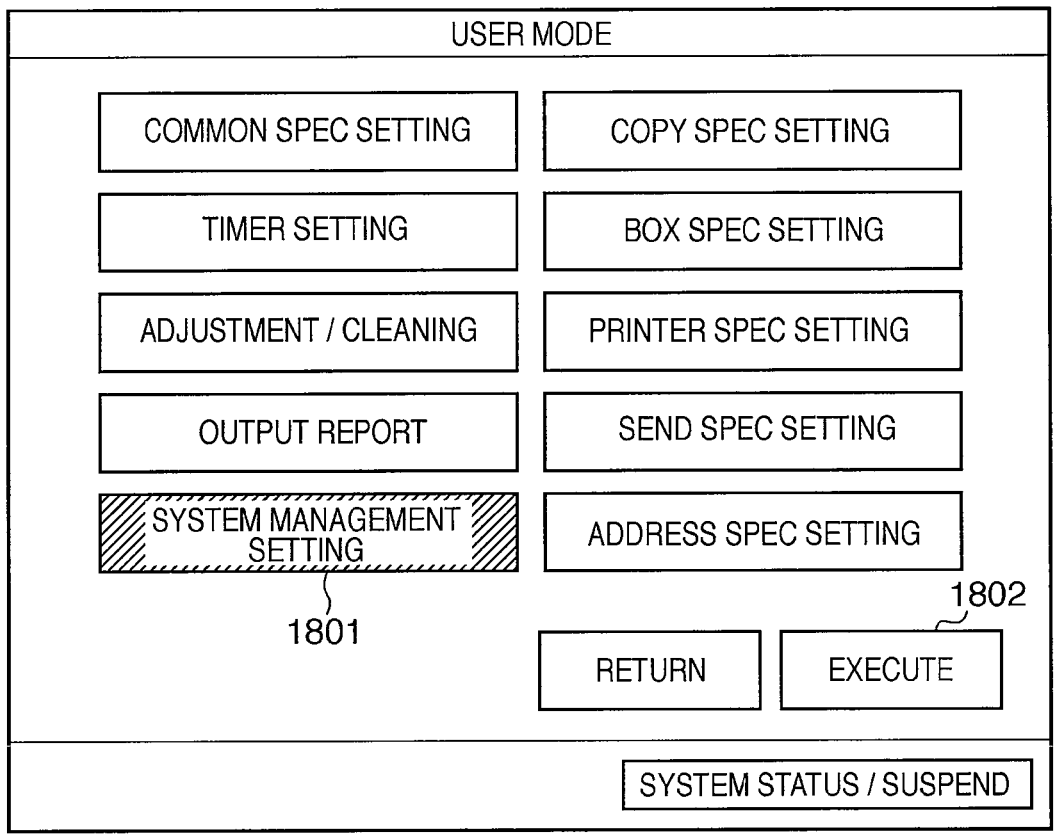
FIG. 18 is a diagram illustrating an example of a user interface screen for making various operational settings in an MFP.

FIG. 18 is a diagram illustrating an example of a user interface screen for setting various operations of the MFP. Here, in order to carry out the restriction settings for "Send", after setting a cursor to a system management setting 1801, an execute button 1802 is pressed. By pressing this execute button 1802, a user interface screen shown in FIG. 19 is displayed.

Figure 19:
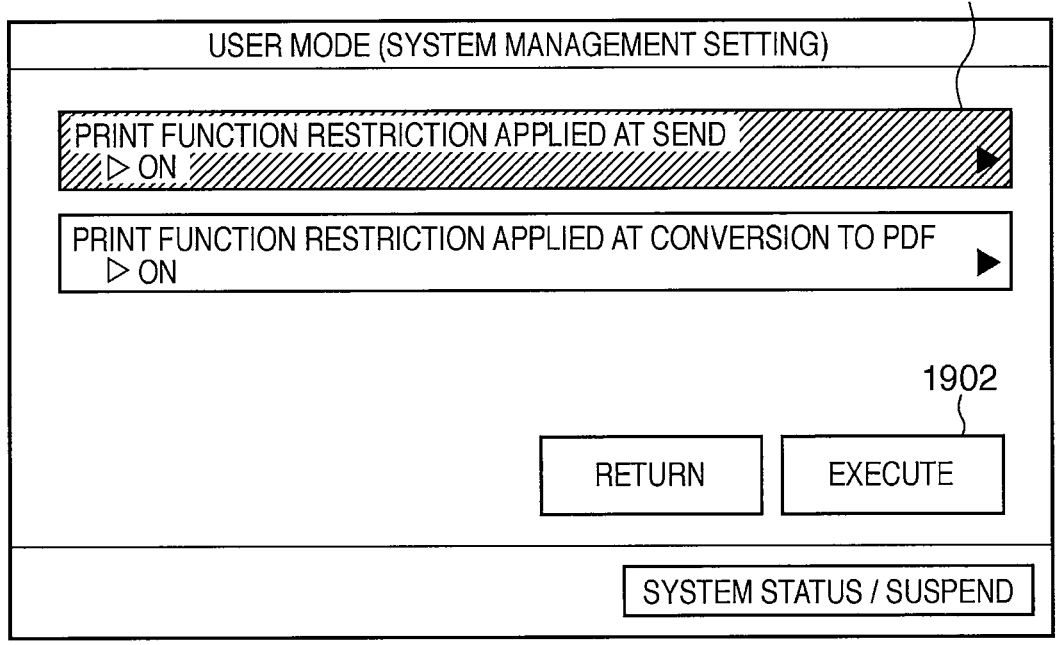
FIG. 19 is a diagram illustrating an example of a user interface screen for a user to set print restrictions at the time of Sending.

On the screen shown in FIG. 19, after setting the cursor to a "apply print function at "Send"" 1901, an execute button 1902 is pressed. By pressing this execute button 1902, a user interface screen shown in FIG. 20 is displayed.

On the screen shown in FIG. 20, items to which the print function restriction setting is applied at the time of Sending are set. On this screen, setting the copy-forgery-inhibited pattern printing, the page printing, the date printing, the stamp printing, and so on to be applied (ON) or not to be applied (OFF) to the image to be sent, and exception items, used when the above is set to "ON" and for which the image merging is not carried out according to, for example, addresses, can be set. On this screen, an "exception applicable" is ticked using a checkbox 2001, after which an execute button 2002 is pressed, thereby displaying the user interface screen shown in FIG. 21.

On the screen shown in FIG. 21, conditions for the ticked "exception applicable" are set. On this screen, a setting is made so as to add no restriction to image merging and the like with respect to a person A when sending an I-fax to the address A.iFax@a.co.jp. For person B, a setting is made so as to add no restriction to an image to be sent when sending a G3-Fax to an address 03-XXXX-XXXX. Furthermore, for person C, a setting is made so as to add no restriction to an image to be sent when sending an e-mail to an address C.email@c.co.jp.

Figure 22:
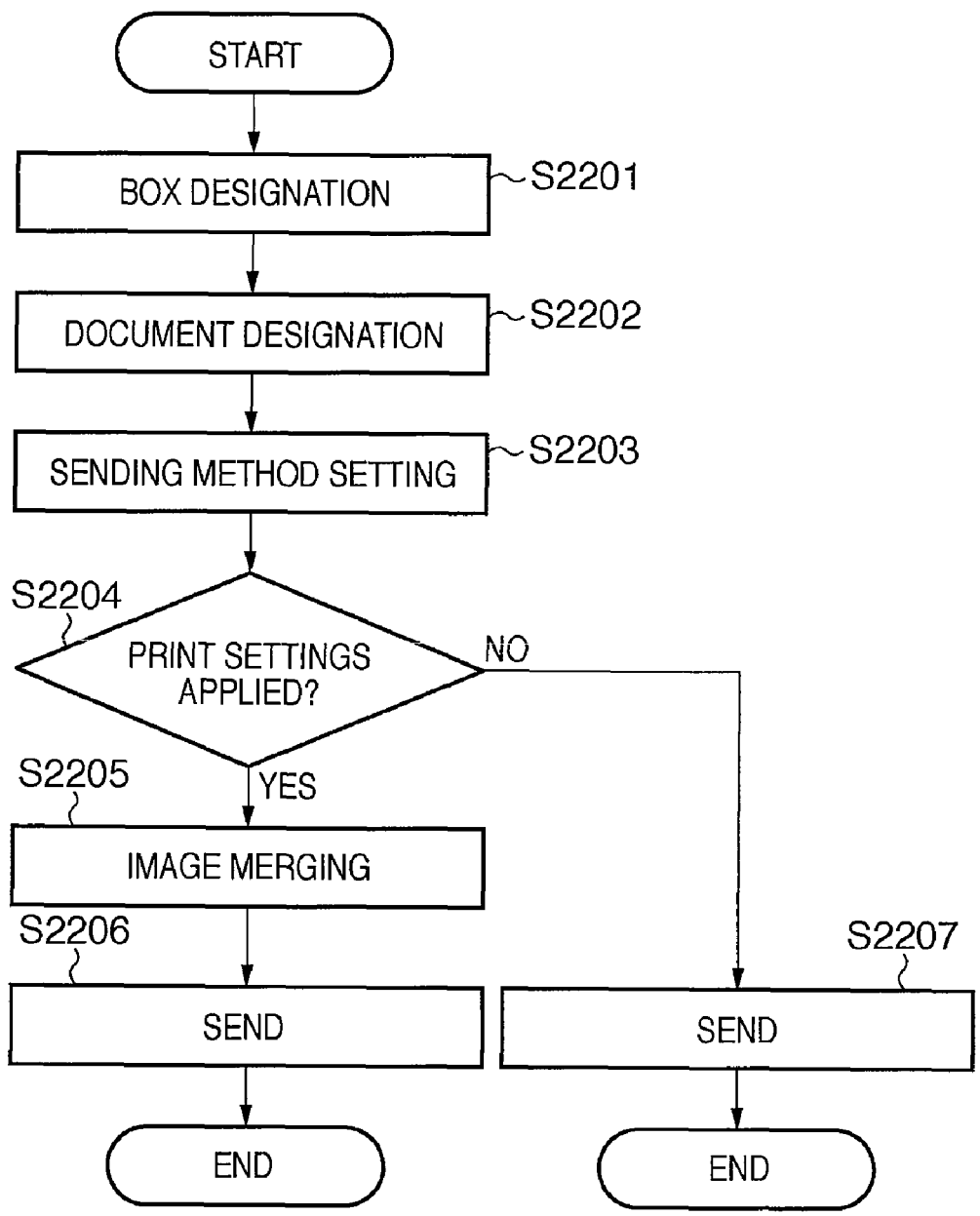
FIG. 22 is a flowchart illustrating a process in the case where a restriction setting is added to an image to be sent at the time of Sending in this embodiment.

FIG. 22 is a flowchart illustrating a process in the case where a restriction setting is applied to an image to be sent at the time of Sending in this embodiment. The processes in steps S2201 to S2203 and S2207 shown in FIG. 22 are the same as the processes in steps S801 to S804 shown in FIG. 8.

In steps S2201 to S2203, a document to be sent is designated, and after a sending method is set, in step S2204, whether or not the print function restriction setting described by using FIG. 20 and FIG. 21 is applied to the image to be sent is determined. When the print function restriction setting is not applied, the process moves to step S2207, and the image to which the print function restriction setting is not applied, as shown in FIG. 17(d), is sent in the same manner as the step S804 shown in FIG. 8.

On the other hand, in step S2204, when the print function restriction setting is applied, the process goes onto the step S2205, and an image merging process as shown in FIG. 23 is carried out.

FIG. 23 is a diagram illustrating a merged image when the print function restriction is applied to the image at the time of Sending. (a) to (c) shown in FIG. 23 correspond to (a) to (c) shown in FIG. 17. As shown in FIG. 23, in this case, an image is merged by adding (a) and (c), thereby forming a merged image as indicated by (d).

Then, in step S2206, the merged image to which the print function restriction is applied is sent, after which the process is terminated.

Next, a process for transferring/copying an image to a portable medium connected to the removable medium controlling device 109 is described with reference to FIG. 24.

Figure 24:
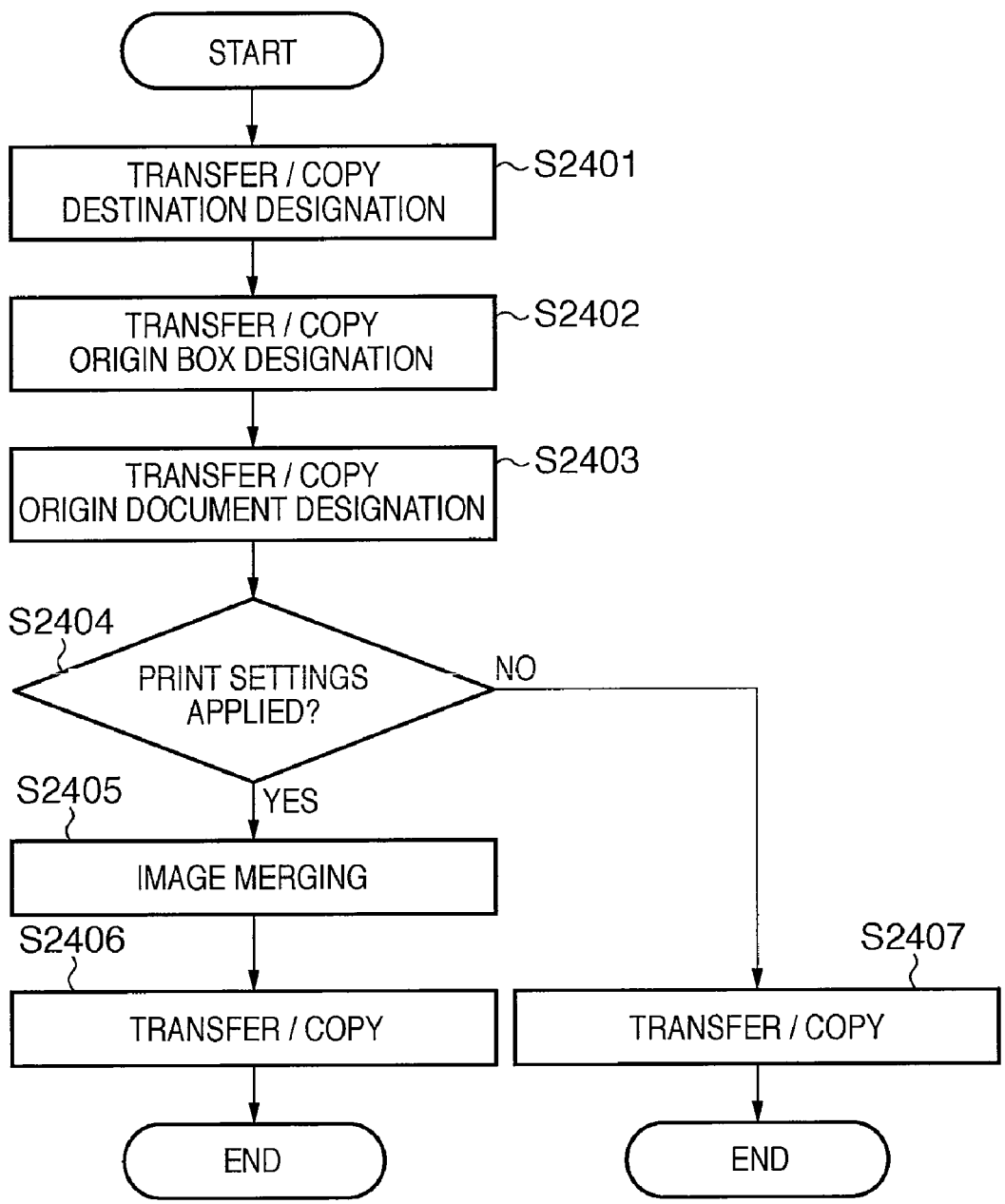
FIG. 24 is a flowchart illustrating a process for transferring or copying an image to a portable medium.
Figure 25:
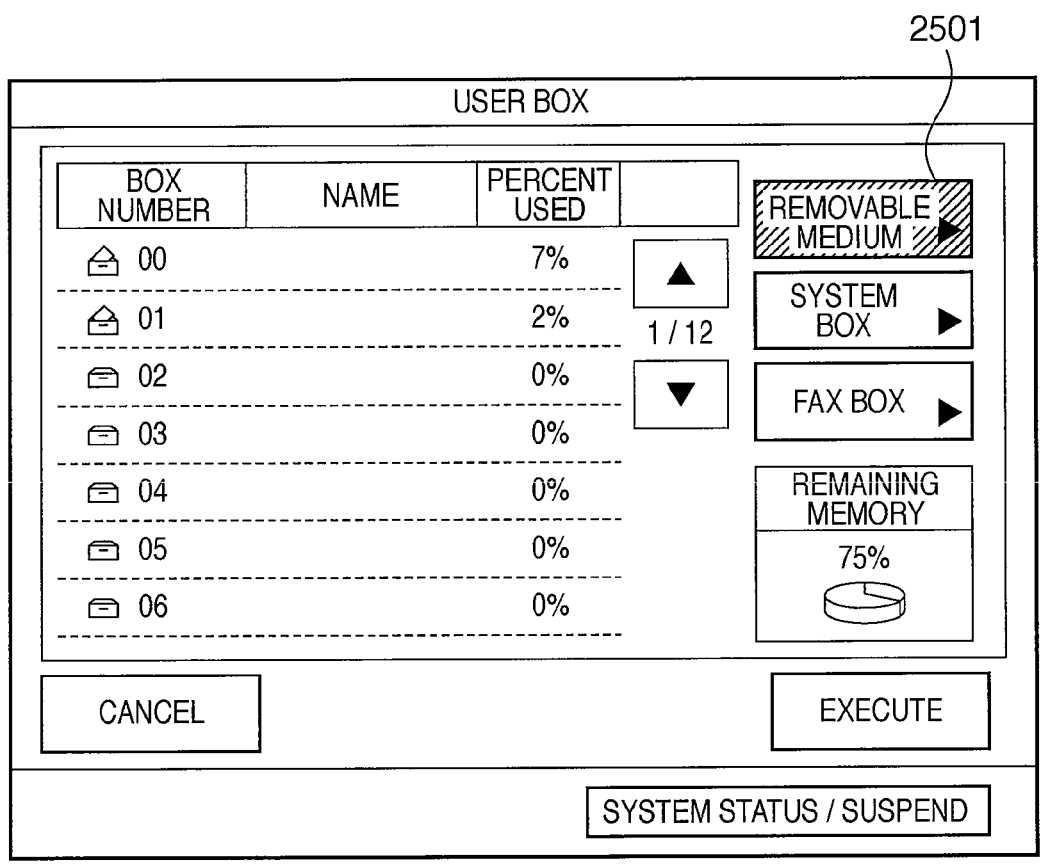
FIG. 25 is a diagram illustrating an example of a user interface screen for a user to designate a transfer/copy destination.
Figure 26:
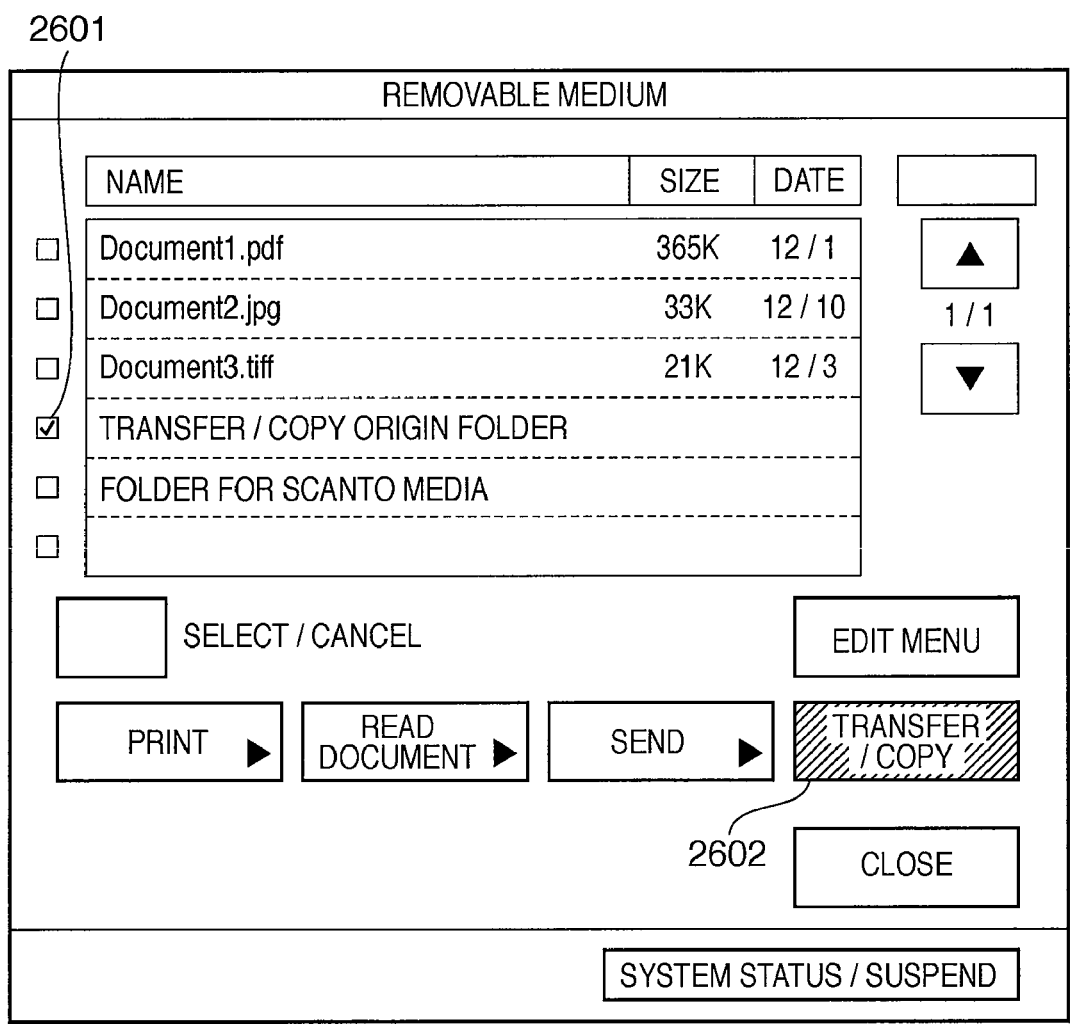
FIG. 26 is a diagram illustrating an example of a user interface screen for a user to designate a box as a transfer/copy origin.

FIG. 24 is a flowchart illustrating a process for transferring or copying an image to a portable medium. First, in step S2401, a user designates a destination to which the image is to be transferred or copied. This designation is carried out on the user interface screen shown in FIG. 25. On the screen shown in FIG. 25, a "removable medium" button 2501 is pressed, and after selecting folders of transfer/copy origin on a user interface screen shown in FIG. 26 by ticking a checkbox 2601, a "transfer/copy" button 2602 is pressed.

Then, in step S2402, the box number of transfer/copy origin, in which the document is stored, is designated. The box number designation is carried out on the user interface screen shown in FIG. 27.

Then, in step S2403, the document of the box designated in step S2402 is designated. This document designation is carried out on the user interface screen shown in FIG. 28. On the screen shown in FIG. 28, after the document to be transferred/copied (after a checkbox 2801 is ticked), an "OK" button 2802 is pressed.

Then, in step S2404, whether or not the print function restriction setting is to be applied to the image to be transferred/copied is determined. This setting of whether or not this print function restriction setting is to be applied is carried out in the same manner as the case where "apply print function restriction at "Send" described above.

In other words, on the screen shown in FIG. 18, after setting a cursor to the system management setting 1801, the execute button 1802 is pressed. By pressing this execute button 1802, the user interface screen shown in FIG. 29 is displayed.

On the screen shown in FIG. 29, after setting the cursor to a "apply print function restriction storing image in removable medium" 2901, an execute button 2902 is pressed. By pressing this execute button 2902, the user interface screen shown in FIG. 30 is displayed.

On the screen shown in FIG. 30, items of the print function to be applied when the image is stored to a removable medium are selected. In this example, setting can be made as to whether image merging is carried out on the image to be stored in a removable medium according to the print settings 303 when setting such as the copy-forgery-inhibited pattern printing, the page printing, the date printing, the stamp printing, and so on are set in the print settings 303.

Then, referring back to FIG. 24, as a result of the determination made in step S2404, the process goes on to a step S2407 when the print settings 303 are not active. In step S2407, the image of the page stored in the document in the box is written into a portable medium connected to the removable medium controlling device 109 without being processed, after which the process is terminated.

On the other hand, in step S2404, the process goes onto a step S2405 when the print settings 303 are active, and an image merging process is carried out in the same manner as the case where the print function restriction is applied at the time of Sending, as shown in FIG. 23 and described above.

Then, in step S2406, the merged image to which the print function restriction is applied is written into the portable medium connected via the removable medium controlling device 109, after which the process is terminated.

Note that the present invention may be applied to a system comprising a plurality of devices (for example, a host computer, an interface device, a reader, a printer, and so on), or may be applied to an apparatus comprising a single device (for example, a copy machine, a facsimile device, and so on).

Furthermore, it goes without saying that the object of the present invention can also be achieved by supplying, to a system or apparatus, a storage medium in which the program code for software that realizes the functions of the aforementioned embodiment has been stored, and causing a computer (CPU or MPU) of the system or apparatus to read out and execute the program code stored in the storage medium.

In such a case, the program code itself read out from the computer-readable storage medium implements the functionality of the aforementioned embodiment, and the storage medium in which the program code is stored composes the present invention.

Examples of a storage medium for supplying the program code include a flexible disk, a hard disk, an optical disk, a magneto-optical disk, a CD-ROM, a CD-R, magnetic tape, a non-volatile memory card, a ROM, and so on.

Moreover, it goes without saying that the following case also falls under the scope of the present invention, which is not limited to implementing the functions of the aforementioned embodiment by a computer executing the read-out program code. That is, the case where an operating system (OS) or the like running in a computer performs part or all of the actual processing based on instructions in the program code, and the functionality of the aforementioned embodiment is realized by that processing, is included in the scope of the present invention.

Furthermore, the program code read out from the storage medium may be written into a memory provided in a function expansion board installed in the computer or a function expansion unit connected to the computer. Then, a CPU or the like included in the function expansion board or expansion unit performs all or part of the actual processing based on instructions included in the program code, and the functions of the aforementioned embodiment may be implemented through that processing. It goes without saying that this also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-174578 filed on Jul. 2, 2007, which is hereby incorporated by reference herein in its entirety.

What is claimed is:

1. An image processing apparatus having a print function, comprising:
 a determination unit that determines whether or not to reflect a merging setting of a copy-forgery-inhibited image in image data output by a Send function which transmits the image data to an external apparatus based on settings operated by a user via a user interface,
 wherein the merging setting of the copy-forgery-inhibited image is a setting when the copy-forgery-inhibited image comprised of a latent image and a background image is merged and printed on the image data, the latent image being left when a printed material is copied and the background image disappearing when the printed material is copied;

a merging unit that merges the image data and the latent image without merging the background image in a case where the image data is output by the Send function and it is determined by the determination unit that it reflects the merging setting in the output image data; and a display unit that displays a screen for setting exception items that do not reflect the merging setting in the output image data even if it is determined by the determination unit that it reflects the merging setting in the output image data, the screen being used for setting an output destination of the image data as the exception items, wherein, when the exception items are not set in the Send function, a merging result of the image data and the latent image merged by the merging unit is output, and when the output destination is set as the exception items in the Send function, the image data to which merging processing is not performed by the merging unit is output to the output destination, and wherein, in the print function, a merging result of the image data, latent image and the background image merged by the merging unit is output.

2. The apparatus according to claim 1, wherein the exception items in the Send function to which the print function restriction setting is applied are set in accordance with a communication protocol when the image data is transmitted to the output destination, and wherein the merging setting is not reflected in a case where the output destination and the communication protocol are set, and the merging setting is reflected besides.

3. An image processing method executed by an image processing apparatus having a print function, the method comprising:

determining whether or not to reflect a merging setting of a copy-forgery-inhibited image in image data output by a Send function which transmits the image data to an external apparatus based on settings operated by a user via a user interface, wherein the merging setting of the copy-forgery-inhibited image is a setting when the copy-forgery-inhibited image comprised of a latent image and a background image is merged and printed on the image data, the latent image being left when a printed material is copied and the background image disappearing when the printed material is copied;

merging the image data and the latent image without merging the background image in a case where the image data is output by the Send function and it is determined in the determining step that it reflects the merging setting in the output image data; and displaying a screen for setting exception items that do not reflect the merging setting in the output image data even if it is determined in the determining step that it reflects the merging setting in the output image data, the screen being used for setting an output destination of the image data as the exception items, wherein, when the exception items is not set in the Send function, a merging result of the image data and the latent image merged in the merging step is output, and when the output destination are set as the exception items in the Send function, the image data to which merging processing is not performed in the merging step is output to the output destination, and wherein, in the print function, a merging result of the image data, latent image and the background image merged in the merging step is output.

4. A non-transitory computer-readable recording medium in which a program for causing a computer to execute an image processing method executed by an image processing apparatus having a print function, the method comprising:

determining whether or not to reflect a merging setting of a copy-forgery-inhibited image in image data output by a Send function which transmits the image data to an external apparatus based on settings operated by a user via a user interface, wherein the merging setting of the copy-forgery-inhibited image is a setting when the copy-forgery-inhibited image comprised of a latent image and a background image is merged and printed on the image data, the latent image being left when a printed material is copied and the background image disappearing when the printed material is copied;

merging the image data and the latent image without merging the background image in a case where the image data is output by the Send function and it is determined in the determining step that it reflects the merging setting in the output image data; and displaying a screen for setting exception items that do not reflect the merging setting in the output image data even if it is determined in the determining step that it reflects the merging setting in the output image data, the screen being used for setting an output destination of the image data as the exception items, wherein, when the exception items are not set in the Send function, a merging result of the image data and the latent image merged in the merging step is output, and when the output destination is set as the exception items in the Send function, the image data to which merging processing is not performed in the merging step is output to the output destination, and wherein, in the print function, a merging result of the image data, latent image and the background image merged in the merging step is output.

* * * * *